US006158841A

United States Patent [19]
Kakutani

[11] Patent Number: 6,158,841
[45] Date of Patent: Dec. 12, 2000

[54] DOT RECORDING WITH PLURAL NOZZLE GROUPS

[75] Inventor: Toshiaki Kakutani, Nagano-ken, Japan

[73] Assignee: Seiko Epson Corporation, Tokyo, Japan

[21] Appl. No.: 09/249,140

[22] Filed: Feb. 12, 1999

[30] Foreign Application Priority Data

Feb. 17, 1998 [JP] Japan .................................. 10-052739

[51] Int. Cl.[7] .............................. B41J 2/145; B41J 2/15; B41J 29/38
[52] U.S. Cl. ................................ 347/40; 347/41; 347/12; 347/9; 347/16
[58] Field of Search ................................ 347/40, 41, 12, 347/16, 9

[56] References Cited

U.S. PATENT DOCUMENTS

| | | | |
|---|---|---|---|
| 4,198,642 | 4/1980 | Gamblin | 347/41 |
| 4,967,203 | 10/1990 | Doan et al. | 347/41 |

FOREIGN PATENT DOCUMENTS

| | | |
|---|---|---|
| 53-2040 | 1/1978 | Japan . |
| 4-19030 | 3/1992 | Japan . |

*Primary Examiner*—Thinh Nguyen
*Attorney, Agent, or Firm*—Oblon, Spivak, McClelland, Maier & Neustadt, P.C.

[57] ABSTRACT

A plurality of nozzles in use are classified into M nozzle groups, each nozzle group including Neff nozzles, where Neff is an integer of not less than 2 and M is an integer of not less than 2. A plurality of dot positions on each raster line are also classified into M different types of dot positions. The Neff nozzles included in each nozzle group execute dot recording at one identical type of dot positions, whereas the different nozzle groups respective execute dot recording at different types of dot positions. A variety of methods are applicable for the nozzle classification. One available method classifies the plurality of nozzles into the M nozzle groups that are sequentially aligned in a sub-scanning direction to be separated from each other. In another available method, the plurality of nozzles are sequentially allocated to the M element groups one by one along the sub-scanning direction

14 Claims, 38 Drawing Sheets

NOZZLE NUMBERS FOR RECORDING RESPECTIVE RASTER LINES (SECOND DOT RECORDING SCHEME)

| RASTER No. | No. of SUBSCAN even | No. of SUBSCAN odd | ADJOIN. even/odd | NUMBER OF SUB-SCAN FEED |
|---|---|---|---|---|
| 0  | 0( -)  | 4( -)  | · ↓ | @8 . . . $3 . . . . . . . . |
| 1  | 5( 5)  | 1(-3)  | X · | . $7 . . . @2 . . . . . . . |
| 2  | 2(-3)  | 6( 5)  | · X | . . @6 . . . $1 . . . . . . |
| 3  | 7( 5)  | 3(-3)  | X ↓ | . . . $5 . . . @0 . . . . . |
| 4  | 4(-3)  | 0(-3)  | ↓ · | $9 . . . @4 . . . . . . . . |
| 5  | 1(-3)  | 5( 5)  | · X | . @8 . . . $3 . . . . . . . |
| 6  | 6( 5)  | 2(-3)  | X · | . . $7 . . . @2 . . . . . . |
| 7  | 3(-3)  | 7( 5)  | · X | . . . @6 . . . $1 . . . . . |
| 8  | 8( 5)  | 4(-3)  | X ↓ | . . . . $5 . . . @0 . . . . |
| 9  | 5(-3)  | 1(-3)  | ↓ · | . $9 . . . @4 . . . . . . . |
| 10 | 2(-3)  | 6( 5)  | · X | . . @8 . . . $3 . . . . . . |
| 11 | 7( 5)  | 3(-3)  | X · | . . . $7 . . . @2 . . . . . |
| 12 | 4(-3)  | 8( 5)  | · X | . . . . @6 . . . $1 . . . . |
| 13 | 9( 5)  | 5(-3)  | X ↓ | . . . . . $5 . . . @0 . . . |
| 14 | 6(-3)  | 2(-3)  | ↓ · | . . $9 . . . @4 . . . . . . |
| 15 | 3(-3)  | 7( 5)  | · X | . . . @8 . . . $3 . . . . . |
| 16 | 8( 5)  | 4(-3)  | X · | . . . . $7 . . . @2 . . . . |
| 17 | 5(-3)  | 9( 5)  | · X | . . . . . @6 . . . $1 . . . |
| 18 | 10( 5) | 6(-3)  | X ↓ | . . . . . . $5 . . . @0 . . |
| 19 | 7(-3)  | 3(-3)  | ↓ · | . . . $9 . . . @4 . . . . . |
| 20 | 4(-3)  | 8( 5)  | · X | . . . . @8 . . . $3 . . . . |
| 21 | 9( 5)  | 5(-3)  | X · | . . . . . $7 . . . @2 . . . |
| 22 | 6(-3)  | 10( 5) | · X | . . . . . . @6 . . . $1 . . |
| 23 | 11( 5) | 7(-3)  | X ↓ | . . . . . . . $5 . . . @0 . |
| 24 | 8(-3)  | 4(-3)  | ↓ · | . . . . $9 . . . @4 . . . . |
| 25 | 5(-3)  | 9( 5)  | · X | . . . . . @8 . . . $3 . . . |
| 26 | 10( 5) | 6(-3)  | X · | . . . . . . $7 . . . @2 . . |
| 27 | 7(-3)  | 11( 5) | · X | . . . . . . . @6 . . . $1 . |
| 28 | 12( 5) | 8(-3)  | X ↓ | . . . . . . . . $5 . . . @0 |

@ : NOZZLES TO RECORD EVEN PIXELS
$ : NOZZLES TO RECORD ODD PIXELS

Fig. 5 (A)  ARRANGEMENT OF NOZZLE ARRAYS
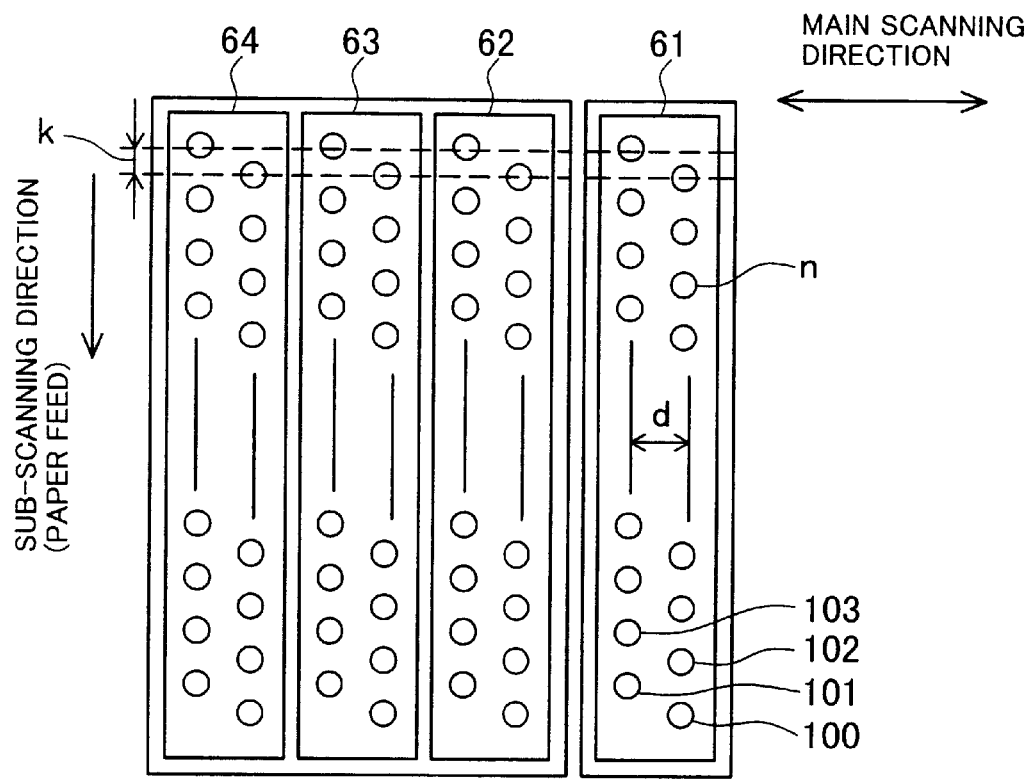
Fig. 5 (B)  DOTS FORMED BY ONE NOZZLE ARRAY

Fig. 6 (A)  CONCEPT OF SUB-SCAN FEED(s=1)
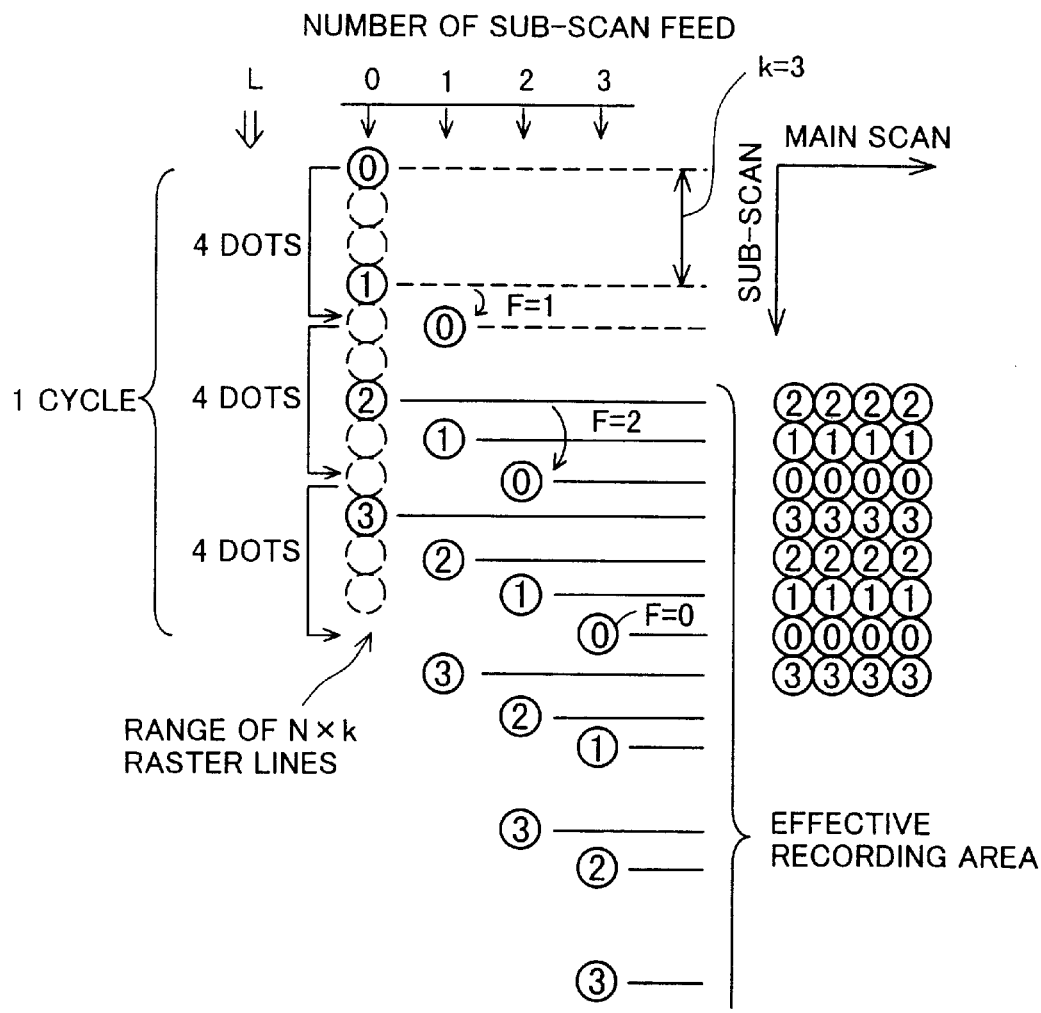
Fig. 6 (B)  PARAMETERS
NOZZLE PITCH k : 3 [dot]
NUMBER OF USED NOZZLES N : 4
NUMBER OF SCAN REPEATS s : 1
NUMBER OF EFFECTIVE NOZZLES Neff : 4
| NUMBER OF SUB-SCAN FEED | 0 | 1 | 2 | 3 |
|---|---|---|---|---|
| FEED AMOUNT L [dot] | 0 | 4 | 4 | 4 |
| ΣL | 0 | 4 | 8 | 12 |
| F=(ΣL)%k | 0 | 1 | 2 | 0 |

Fig. 7 (A) CONCEPT OF SUB-SCAN FEED(s=2)
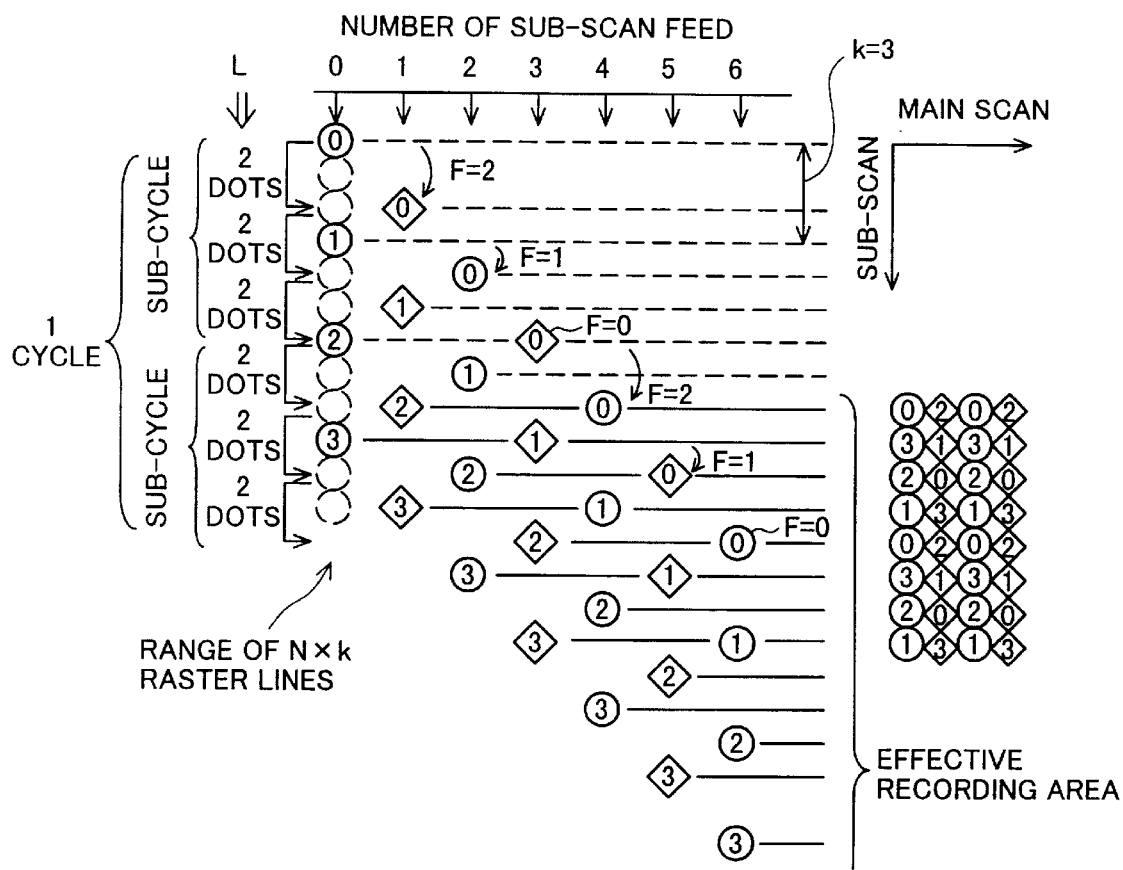
Fig. 7 (B) PARAMETERS
NOZZLE PITCH k : 3 [dot]
NUMBER OF USED NOZZLES N : 4
NUMBER OF SCAN REPEATS s : 2
NUMBER OF EFFECTIVE NOZZLES Neff : 2
| NUMBER OF SUB-SCAN FEED | 0 | 1 | 2 | 3 | 4 | 5 | 6 |
|---|---|---|---|---|---|---|---|
| FEED AMOUNT L [dot] | 0 | 2 | 2 | 2 | 2 | 2 | 2 |
| ΣL | 0 | 2 | 4 | 6 | 8 | 10 | 12 |
| F=(ΣL)%k | 0 | 2 | 1 | 0 | 2 | 1 | 0 |

Fig. 9(A)
SCAN PARAMETERS FOR FIRST DOT RECORDING SCHEME

NOZZLE PITCH k : 4 [dot]
NUMBER OF USED NOZZLES N : 10
NUMBER OF NOZZLE GROUPS M : 2
NUMBER OF EFFECTIVE NOZZLES Neff : 5
RECORDING START RASTER LINE NUMBER: 32
PIXEL POSITION TO BE RECORDED :

| NOZZLE No. | @0 | @1 | @2 | @3 | @4 | $5 | $6 | $7 | $8 | $9 |
|---|---|---|---|---|---|---|---|---|---|---|
| PIXEL POSITION | even | even | even | even | even | odd | odd | odd | odd | odd |

(EFFECTIVE NOZZLE PITCH keff : 4 [dot])

SUB SCAN FEED :

| NUMBER OF SUB-SCAN FEED | 0 | 1 | 2 | 3 | 4 |
|---|---|---|---|---|---|
| FEED AMOUNT L [dot] | 0 | 5 | 5 | 5 | 5 |
| ΣL | 0 | 5 | 10 | 15 | 20 |
| F =(ΣL)%keff | 0 | 1 | 2 | 3 | 0 |

Fig. 9(B)
RASTER NUMBERS OF EFFECTIVE RASTER LINES RECORDED
BY RESPECTIVE NOZZLES

```
NOZZLE      NUMBER OF SUB-SCAN FEED
  No. |  0    1    2    3    4    5    6    7    8    9   10   11   12   13   14   15
  @0  |  .    .    .    .    .    .    .    3    8   13   18   23   28   33   38   43
  @1  |  .    .    .    .    .    .    2    7   12   17   22   27   32   37   42   47
  @2  |  .    .    .    .    .    1    6   11   16   21   26   31   36   41   46   51
  @3  |  .    .    .    .    0    5   10   15   20   25   30   35   40   45   50   55
  @4  |  .    .    .    .    4    9   14   19   24   29   34   39   44   49   54   59
  $5  |  .    .    .    3'   8'  13'  18'  23'  28'  33'  38'  43'  48'  53'  58'  63'
  $6  |  .    .    2'   7'  12'  17'  22'  27'  32'  37'  42'  47'  52'  57'  62'  67'
  $7  |  .    1'   6'  11'  16'  21'  26'  31'  36'  41'  46'  51'  56'  61'  66'  71'
  $8  |  0'   5'  10'  15'  20'  25'  30'  35'  40'  45'  50'  55'  60'  65'  70'  75'
  $9  |  4'   9'  14'  19'  24'  29'  34'  39'  44'  49'  54'  59'  64'  69'  74'  79'
```

1, 2 ··· : EVEN PIXELS ARE TO BE RECORDED.
1', 2'··· : ODD PIXELS ARE TO BE RECORDED.

Fig. 10

NOZZLE NUMBERS FOR RECORDING RESPECTIVE RASTER LINES
(FIRST DOT RECORDING SCHEME)

| RASTER No. | No. of SUBSCAN even | odd | ADJOIN. even/odd | NUMBER OF SUB-SCAN FEED 0 1 2 3 4 5 6 7 8 9 10 11 12 |
|---|---|---|---|---|
| 0  | 4( -)  | 0( -)  | · · *  | $8 . . . @3 |
| 1  | 5( 1)  | 1( 1)  | ↑ ↑ *  | . $7 . . . @2 |
| 2  | 6( 1)  | 2( 1)  | ↑ ↑ *  | . . $6 . . . @1 |
| 3  | 7( 1)  | 3( 1)  | X X *  | . . . $5 . . . @0 |
| 4  | 4( -3) | 0( -3) | · · *  | $9 . . . @4 |
| 5  | 5( 1)  | 1( 1)  | ↑ ↑ *  | . $8 . . . @3 |
| 6  | 6( 1)  | 2( 1)  | ↑ ↑ *  | . . $7 . . . @2 |
| 7  | 7( 1)  | 3( 1)  | ↑ ↑ *  | . . . $6 . . . @1 |
| 8  | 8( 1)  | 4( 1)  | X X *  | . . . . $5 . . . @0 |
| 9  | 5( -3) | 1( -3) | · · *  | . $9 . . . @4 |
| 10 | 6( 1)  | 2( 1)  | ↑ ↑ *  | . . $8 . . . @3 |
| 11 | 7( 1)  | 3( 1)  | ↑ ↑ *  | . . . $7 . . . @2 |
| 12 | 8( 1)  | 4( 1)  | ↑ ↑ *  | . . . . $6 . . . @1 |
| 13 | 9( 1)  | 5( 1)  | X X *  | . . . . . $5 . . . @0 |
| 14 | 6( -3) | 2( -3) | · · *  | . . $9 . . . @4 |
| 15 | 7( 1)  | 3( 1)  | ↑ ↑ *  | . . . $8 . . . @3 |
| 16 | 8( 1)  | 4( 1)  | ↑ ↑ *  | . . . . $7 . . . @2 |
| 17 | 9( 1)  | 5( 1)  | ↑ ↑ *  | . . . . . $6 . . . @1 |
| 18 | 10( 1) | 6( 1)  | X X *  | . . . . . . $5 . . . @0 |
| 19 | 7( -3) | 3( -3) | · · *  | . . . $9 . . . @4 |
| 20 | 8( 1)  | 4( 1)  | ↑ ↑ *  | . . . . $8 . . . @3 |
| 21 | 9( 1)  | 5( 1)  | ↑ ↑ *  | . . . . . $7 . . . @2 |
| 22 | 10( 1) | 6( 1)  | ↑ ↑ *  | . . . . . . $6 . . . @1 |
| 23 | 11( 1) | 7( 1)  | X X *  | . . . . . . . $5 . . . @0 |
| 24 | 8( -3) | 4( -3) | · · *  | . . . . $9 . . . @4 |
| 25 | 9( 1)  | 5( 1)  | ↑ ↑ *  | . . . . . $8 . . . @3 |
| 26 | 10( 1) | 6( 1)  | ↑ ↑ *  | . . . . . . $7 . . . @2 |
| 27 | 11( 1) | 7( 1)  | ↑ ↑ *  | . . . . . . . $6 . . . @1 |
| 28 | 12( 1) | 8( 1)  | X X *  | . . . . . . . . $5 . . . @0 |

@ : NOZZLES TO RECORD EVEN PIXELS
$ : NOZZLES TO RECORD ODD PIXELS

Fig. 11(A)
SCAN PARAMETERS FOR FIRST COMPARATIVE EXAMPLE

NOZZLE PITCH k : 4 [dot]
NUMBER OF USED NOZZLES N : 10
NUMBER OF REPEATED SCANS s : 2
NUMBER OF EFFECTIVE NOZZLES Neff : 5
RECORDING START RASTER LINE NUMBER: 32

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 5 | 5 | 5 | 5 | 5 |
| $\Sigma L$ | 0 | 5 | 10 | 15 | 20 | 25 | 30 | 35 | 40 |
| $F = (\Sigma L)\%keff$ | 0 | 1 | 2 | 3 | 0 | 1 | 2 | 3 | 0 |
| PIXEL POSITION TO BE RECORDED | even | odd | even | odd | odd | even | odd | even | even |

Fig. 11(B)
RASTER NUMBERS OF EFFECTIVE RASTER LINES RECORDED
BY RESPECTIVE NOZZLES

```
NOZZLE      NUMBER OF SUB-SCAN FEED
 No. |  0    1    2    3    4    5    6    7    8    9   10   11
   0 |  .    .    .    .    .    .    .    3    8   13'  18   23'
   1 |  .    .    .    .    .    .    2'   7   12   17'  22   27'
   2 |  .    .    .    .    .    1    6'  11   16   21'  26   31'
   3 |  .    .    .    .    0'   5   10'  15   20   25'  30   35'
   4 |  .    .    .    .    4'   9   14'  19   24   29'  34   39'
   5 |  .    .    .    3'   8   13   18'  23   28   33'  38   43'
   6 |  .    .    2    7'  12'  17   22'  27'  32   37'  42   47'
   7 |  .    1'   6   11'  16'  21   26'  31'  36   41'  46   51'
   8 |  0    5'  10   15'  20'  25   30'  35'  40   45'  50   55'
   9 |  4    9'  14   19'  24'  29   34'  39'  44   49'  54   59'
```

1, 2 ··· : EVEN PIXELS ARE TO BE RECORDED.
1', 2'··· : ODD PIXELS ARE TO BE RECORDED.

Fig. 12

NOZZLE NUMBERS FOR RECORDING RESPECTIVE RASTER LINES
(FIRST CONTROL EXAMPLE)

| RASTER No. | No. of SUBSCAN even | odd | ADJOIN. even/odd | NUMBER OF SUB-SCAN FEED 0 1 2 3 4 5 6 7 8 9 10 11 12 |
|---|---|---|---|---|
| 0  | 0( -)  | 4( -)  | · · * | @8 . . . $3 |
| 1  | 1( 1)  | 5( 1)  | ↑ ↑ * | . @7 . . . $2 |
| 2  | 2( 1)  | 6( 1)  | ↑ ↑ * | . . @6 . . . $1 |
| 3  | 3( 1)  | 7( 1)  | X X * | . . . @5 . . . $0 |
| 4  | 0( -3) | 4( -3) | · · * | @9 . . . $4 |
| 5  | 1( 1)  | 5( 1)  | ↑ ↑ * | . @8 . . . $3 |
| 6  | 2( 1)  | 6( 1)  | ↑ ↑ * | . . @7 . . . $2 |
| 7  | 3( 1)  | 7( 1)  | ↑ X   | . . . @6 . . . $1 |
| 8  | 8( 5)  | 4( -3) | X ·   | . . . . $5 . . . @0 |
| 9  | 1( -7) | 5( 1)  | · ↑   | . @9 . . . $4 |
| 10 | 2( 1)  | 6( 1)  | ↑ ↑ * | . . @8 . . . $3 |
| 11 | 3( 1)  | 7( 1)  | ↑ X   | . . . @7 . . . $2 |
| 12 | 8( 5)  | 4( -3) | ↑ ·   | . . . . $6 . . . @1 |
| 13 | 9( 1)  | 5( 1)  | X ↑   | . . . . . $5 . . . @0 |
| 14 | 2( -7) | 6( 1)  | · ↑   | . . @9 . . . $4 |
| 15 | 3( 1)  | 7( 1)  | ↑ X   | . . . @8 . . . $3 |
| 16 | 8( 5)  | 4( -3) | ↑ ·   | . . . . $7 . . . @2 |
| 17 | 9( 1)  | 5( 1)  | ↑ ↑ * | . . . . $6 . . . @1 |
| 18 | 10( 1) | 6( 1)  | X ↑   | . . . . . $5 . . . @0 |
| 19 | 3( -7) | 7( 1)  | · X   | . . . @9 . . . $4 |
| 20 | 8( 5)  | 4( -3) | ↑ ·   | . . . . $8 . . . @3 |
| 21 | 9( 1)  | 5( 1)  | ↑ ↑ * | . . . . . $7 . . . @2 |
| 22 | 10( 1) | 6( 1)  | ↑ ↑ * | . . . . . . $6 . . . @1 |
| 23 | 11( 1) | 7( 1)  | X X * | . . . . . . . $5 . . . @0 |
| 24 | 8( -3) | 4( -3) | · · * | . . . . $9 . . . @4 |
| 25 | 9( 1)  | 5( 1)  | ↑ ↑ * | . . . . . $8 . . . @3 |
| 26 | 10( 1) | 6( 1)  | ↑ ↑ * | . . . . . . $7 . . . @2 |
| 27 | 11( 1) | 7( 1)  | X ↑   | . . . . . . . $6 . . . @1 |
| 28 | 8( -3) | 12( 5) | · X   | . . . . . . . . @5 . . . $0 |

@ : NOZZLES TO RECORD EVEN PIXELS
$ : NOZZLES TO RECORD ODD PIXELS

Fig. 13(A)
SCAN PARAMETERS FOR FIRST COMPARATIVE EXAMPLE

NOZZLE PITCH k : 4 [dot]
NUMBER OF USED NOZZLES N : 10
NUMBER OF REPEATED SCANS s : 2
NUMBER OF EFFECTIVE NOZZLES Neff : 5
RECORDING START RASTER LINE NUMBER: 32

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 5 | 5 | 5 | 5 | 5 |
| $\Sigma L$ | 0 | 5 | 10 | 15 | 20 | 25 | 30 | 35 | 40 |
| $F = (\Sigma L) \% keff$ | 0 | 1 | 2 | 3 | 0 | 1 | 2 | 3 | 0 |
| PIXEL POSITION TO BE RECORDED | even | even | even | even | odd | odd | odd | odd | even |

Fig. 13(B)
RASTER NUMBERS OF EFFECTIVE RASTER LINES RECORDED
BY RESPECTIVE NOZZLES

| NOZZLE No. | \multicolumn{12}{c}{NUMBER OF SUB-SCAN FEED} |
|---|---|---|---|---|---|---|---|---|---|---|---|---|

| NOZZLE No. | 0 | 1 | 2 | 3 | 4 | 5 | 6 | 7 | 8 | 9 | 10 | 11 |
|---|---|---|---|---|---|---|---|---|---|---|---|---|
| 0 | . | . | . | . | . | . | . | 3' | 8 | 13 | 18 | 23 |
| 1 | . | . | . | . | . | . | 2' | 7' | 12 | 17 | 22 | 27 |
| 2 | . | . | . | . | . | 1' | 6' | 11' | 16 | 21 | 26 | 31 |
| 3 | . | . | . | . | 0' | 5' | 10' | 15' | 20 | 25 | 30 | 35 |
| 4 | . | . | . | . | 4' | 9' | 14' | 19' | 24 | 29 | 34 | 39 |
| 5 | . | . | . | 3 | 8' | 13' | 18' | 23' | 28 | 33 | 38 | 43 |
| 6 | . | . | 2 | 7 | 12' | 17' | 22' | 27' | 32 | 37 | 42 | 47 |
| 7 | . | 1 | 6 | 11 | 16' | 21' | 26' | 31' | 36 | 41 | 46 | 51 |
| 8 | 0 | 5 | 10 | 15 | 20' | 25' | 30' | 35' | 40 | 45 | 50 | 55 |
| 9 | 4 | 9 | 14 | 19 | 24' | 29' | 34' | 39' | 44 | 49 | 54 | 59 |

1, 2 ··· : EVEN PIXELS ARE TO BE RECORDED.
1', 2'··· : ODD PIXELS ARE TO BE RECORDED.

Fig. 14

NOZZLE-NUMBERS FOR RECORDING RESPECTIVE RASTER LINES
(SECOND CONTROL EXAMPLE)

| RASTER No. | No. of SUBSCAN even | No. of SUBSCAN odd | ADJOIN. even/odd | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|
| 0  | 0( -)  | 4( -)  | · ↓   | @8 | . | . | . | $3 | . | . | . | . | . | . | . | . |
| 1  | 5( 5)  | 1( -3) | X ·   | .  | $7| . | . | . | . | @2| . | . | . | . | . | . |
| 2  | 2( -3) | 6( 5)  | · X   | .  | . | @6| . | . | . | . | $1| . | . | . | . | . |
| 3  | 7( 5)  | 3( -3) | X ·   | .  | . | . | $5| . | . | . | . | @0| . | . | . | . |
| 4  | 0( -7) | 4( 1)  | · X   | @9 | . | . | . | $4| . | . | . | . | . | . | . | . |
| 5  | 5( 5)  | 1( -3) | X ·   | .  | $8| . | . | . | . | @3| . | . | . | . | . | . |
| 6  | 2( -3) | 6( 5)  | · X   | .  | . | @7| . | . | . | . | $2| . | . | . | . | . |
| 7  | 7( 5)  | 3( -3) | ↑ ·   | .  | . | . | $6| . | . | . | . | @1| . | . | . | . |
| 8  | 8( 1)  | 4( 1)  | X X * | .  | . | . | . | $5| . | . | . | . | @0| . | . | . |
| 9  | 5( -3) | 1( -3) | ↓ ·   | .  | $9| . | . | . | . | @4| . | . | . | . | . | . |
| 10 | 2( -3) | 6( 5)  | · X   | .  | . | @2| . | . | . | . | $3| . | . | . | . | . |
| 11 | 7( 5)  | 3( -3) | ↑ ·   | .  | . | . | $7| . | . | . | . | @2| . | . | . | . |
| 12 | 8( 1)  | 4( 1)  | X ↑   | .  | . | . | . | $6| . | . | . | . | @1| . | . | . |
| 13 | 5( -3) | 9( 5)  | ↓ X   | .  | . | . | . | . | @5| . | . | . | . | $0| . | . |
| 14 | 2( -3) | 6( -3) | · ↓   | .  | . | @2| . | . | . | . | $4| . | . | . | . | . |
| 15 | 7( 5)  | 3( -3) | ↑ ·   | .  | . | . | $8| . | . | . | . | @3| . | . | . | . |
| 16 | 8( 1)  | 4( 1)  | X ↑   | .  | . | . | . | $7| . | . | . | . | @2| . | . | . |
| 17 | 5( -3) | 9( 5)  | · X   | .  | . | . | . | . | @6| . | . | . | . | $1| . | . |
| 18 | 10( 5) | 6( -3) | X ↓   | .  | . | . | . | . | . | $5| . | . | . | . | @0| . |
| 19 | 7( -3) | 3( -3) | · · * | .  | . | . | $9| . | . | . | . | @4| . | . | . | . |
| 20 | 8( 1)  | 4( 1)  | X ↑   | .  | . | . | . | $8| . | . | . | . | @3| . | . | . |
| 21 | 5( -3) | 9( 5)  | · X   | .  | . | . | . | . | @7| . | . | . | . | $2| . | . |
| 22 | 10( 5) | 6( -3) | X ·   | .  | . | . | . | . | . | $6| . | . | . | . | @1| . |
| 23 | 7( -3) | 11( 5) | · X   | .  | . | . | . | . | . | . | @5| . | . | . | . | $0|
| 24 | 8( 1)  | 4( -7) | X ·   | .  | . | . | . | $9| . | . | . | . | @4| . | . | . |
| 25 | 5( -3) | 9( 5)  | · X   | .  | . | . | . | . | @8| . | . | . | . | $3| . | . |
| 26 | 10( 5) | 6( -3) | X ·   | .  | . | . | . | . | . | $7| . | . | . | . | @2| . |
| 27 | 7( -3) | 11( 5) | · ↑   | .  | . | . | . | . | . | . | @6| . | . | . | . | $2|
| 28 | 8( 1)  | 12( 1) | X X * | .  | . | . | . | . | . | . | . | @5| . | . | . | $1|

@ : NOZZLES TO RECORD EVEN PIXELS
$ : NOZZLES TO RECORD ODD PIXELS

Fig. 16 (a) DOT PATTERN D0-D9 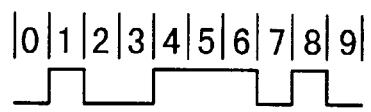
Fig. 16 (b) EVEN PIXEL SELECTION SIGNAL Seven 
Fig. 16 (c) NOZZLE DRIVING CLOCK SIGNAL CLK 
Fig. 16 (d) EVEN PIXEL NOZZLE DRIVING SIGNAL S0-S4 
Fig. 16 (e) DOT PATTERN D0-D9 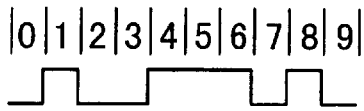
Fig. 16 (f) ODD PIXEL SELECTION SIGNAL Sodd 
Fig. 16 (g) NOZZLE DRIVING CLOCK SIGNAL CLK 
Fig. 16 (h) ODD PIXEL NOZZLE DRIVING SIGNAL S5-S9 

Fig. 17(A)
SCAN PARAMETERS FOR SECOND DOT RECORDING SCHEME

NOZZLE PITCH k : 4 [dot]
NUMBER OF USED NOZZLES N : 10
NUMBER OF NOZZLE GROUPS M : 2
NUMBER OF EFFECTIVE NOZZLES Neff : 5
RECORDING START RASTER LINE NUMBER: 32
PIXEL POSITION TO BE RECORDED :

| NOZZLE No. | @0 | $1 | @2 | $3 | @4 | $5 | @6 | $7 | @8 | $9 |
|---|---|---|---|---|---|---|---|---|---|---|
| PIXEL POSITION | even | odd | even | odd | even | odd | even | odd | even | odd |

(EFFECTIVE NOZZLE PITCH keff : 8 [dot])

SUB SCAN FEED :

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 5 | 5 | 5 | 5 | 5 |
| ΣL | 0 | 5 | 10 | 15 | 20 | 25 | 30 | 35 | 40 |
| F =(ΣL)%keff | 0 | 5 | 2 | 7 | 4 | 1 | 6 | 3 | 0 |

Fig. 17(B)
RASTER NUMBERS OF EFFECTIVE RASTER LINES RECORDED
BY RESPECTIVE NOZZLES

| NOZZLE No. | \multicolumn{16}{c}{NUMBER OF SUB-SCAN FEED} |
|---|---|

| NOZZLE No. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| @0 | . | . | . | . | . | . | . | 3 | 8 | 13 | 18 | 23 | 28 | 33 | 38 | 43 |
| $1 | . | . | . | . | . | . | . | 2' | 7' | 12' | 17' | 22' | 27' | 32' | 37' | 42' | 47' |
| @2 | . | . | . | . | . | . | 1 | 6 | 11 | 16 | 21 | 26 | 31 | 36 | 41 | 46 | 51 |
| $3 | . | . | . | . | . | 0' | 5' | 10' | 15' | 20' | 25' | 30' | 35' | 40' | 45' | 50' | 55' |
| @4 | . | . | . | . | . | 4 | 9 | 14 | 19 | 24 | 29 | 34 | 39 | 44 | 49 | 54 | 59 |
| $5 | . | . | . | 3' | 8' | 13' | 18' | 23' | 28' | 33' | 38' | 43' | 48' | 53' | 58' | 63' |
| @6 | . | . | 2 | 7 | 12 | 17 | 22 | 27 | 32 | 37 | 42 | 47 | 52 | 57 | 62 | 67 |
| $7 | . | 1' | 6' | 11' | 16' | 21' | 26' | 31' | 36' | 41' | 46' | 51' | 56' | 61' | 66' | 71' |
| @8 | 0 | 5 | 10 | 15 | 20 | 25 | 30 | 35 | 40 | 45 | 50 | 55 | 60 | 65 | 70 | 75 |
| $9 | 4' | 9' | 14' | 19' | 24' | 29' | 34' | 39' | 44' | 49' | 54' | 59' | 64' | 69' | 74' | 79' |

1, 2 ··· : EVEN PIXELS ARE TO BE RECORDED.
1', 2'··· : ODD PIXELS ARE TO BE RECORDED.

Fig. 18

NOZZLE NUMBERS FOR RECORDING RESPECTIVE RASTER LINES
(SECOND DOT RECORDING SCHEME)

| RASTER No. | No. of SUBSCAN even | No. of SUBSCAN odd | ADJOIN. even/odd | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|
| 0  | 0( -)  | 4( -)  | · ↓ | @8 |     |     |     | $3  |     |     |     |     |   |    |    |    |
| 1  | 5( 5)  | 1( -3) | X · |    | $7  |     |     |     | @2  |     |     |     |   |    |    |    |
| 2  | 2( -3) | 6( 5)  | · X |    |     | @6  |     |     |     | $1  |     |     |   |    |    |    |
| 3  | 7( 5)  | 3( -3) | X ↓ |    |     |     | $5  |     |     |     | @0  |     |   |    |    |    |
| 4  | 4( -3) | 0( -3) | ↓ · | $9 |     |     |     | @4  |     |     |     |     |   |    |    |    |
| 5  | 1( -3) | 5( 5)  | · X |    | @8  |     |     |     | $3  |     |     |     |   |    |    |    |
| 6  | 6( 5)  | 2( -3) | X · |    |     | $7  |     |     |     | @2  |     |     |   |    |    |    |
| 7  | 3( -3) | 7( 5)  | · X |    |     |     | @6  |     |     |     | $1  |     |   |    |    |    |
| 8  | 8( 5)  | 4( -3) | X ↓ |    |     |     |     | $5  |     |     |     | @0  |   |    |    |    |
| 9  | 5( -3) | 1( -3) | ↓ · |    | $9  |     |     |     | @4  |     |     |     |   |    |    |    |
| 10 | 2( -3) | 6( 5)  | · X |    |     | @8  |     |     |     | $3  |     |     |   |    |    |    |
| 11 | 7( 5)  | 3( -3) | X · |    |     |     | $7  |     |     |     | @2  |     |   |    |    |    |
| 12 | 4( -3) | 8( 5)  | · X |    |     |     |     | @6  |     |     |     | $1  |   |    |    |    |
| 13 | 9( 5)  | 5( -3) | X ↓ |    |     |     |     |     | $5  |     |     |     | @0 |    |    |    |
| 14 | 6( -3) | 2( -3) | ↓ · |    |     | $9  |     |     |     | @4  |     |     |   |    |    |    |
| 15 | 3( -3) | 7( 5)  | · X |    |     |     | @8  |     |     |     | $3  |     |   |    |    |    |
| 16 | 8( 5)  | 4( -3) | X · |    |     |     |     | $7  |     |     |     | @2  |   |    |    |    |
| 17 | 5( -3) | 9( 5)  | · X |    |     |     |     |     | @6  |     |     |     | $1 |    |    |    |
| 18 | 10( 5) | 6( -3) | X ↓ |    |     |     |     |     |     | $5  |     |     |   | @0 |    |    |
| 19 | 7( -3) | 3( -3) | ↓ · |    |     |     | $9  |     |     |     | @4  |     |   |    |    |    |
| 20 | 4( -3) | 8( 5)  | · X |    |     |     |     | @8  |     |     |     | $3  |   |    |    |    |
| 21 | 9( 5)  | 5( -3) | X · |    |     |     |     |     | $7  |     |     |     | @2 |    |    |    |
| 22 | 6( -3) | 10( 5) | · X |    |     |     |     |     |     | @6  |     |     |   | $1 |    |    |
| 23 | 11( 5) | 7( -3) | X ↓ |    |     |     |     |     |     |     | $5  |     |   |    | @0 |    |
| 24 | 8( -3) | 4( -3) | ↓ · |    |     |     |     | $9  |     |     |     | @4  |   |    |    |    |
| 25 | 5( -3) | 9( 5)  | · X |    |     |     |     |     | @8  |     |     |     | $3 |    |    |    |
| 26 | 10( 5) | 6( -3) | X · |    |     |     |     |     |     | $7  |     |     |   | @2 |    |    |
| 27 | 7( -3) | 11( 5) | · X |    |     |     |     |     |     |     | @6  |     |   |    | $1 |    |
| 28 | 12( 5) | 8( -3) | X ↓ |    |     |     |     |     |     |     |     | $5  |   |    |    | @0 |

@ : NOZZLES TO RECORD EVEN PIXELS
$ : NOZZLES TO RECORD ODD PIXELS

Fig. 19(A)
SCAN PARAMETERS FOR THIRD DOT RECORDING SCHEME

NOZZLE PITCH k : 4 [dot]
NUMBER OF USED NOZZLES N : 14
NUMBER OF NOZZLE GROUPS M : 2
NUMBER OF EFFECTIVE NOZZLES Neff : 7
RECORDING START RASTER LINE NUMBER: 40
PIXEL POSITION TO BE RECORDED :

| NOZZLE No. | @0 | $1 | @2 | $3 | @4 | $5 | @6 | $7 | @8 | $9 |
|---|---|---|---|---|---|---|---|---|---|---|
| PIXEL POSITION | even | odd | even | odd | even | odd | even | odd | even | odd |
| NOZZLE No. | @10 | $11 | @12 | $13 | | | | | | |
| PIXEL POSITION | even | odd | even | odd | | | | | | |

(EFFECTIVE NOZZLE PITCH keff : 8 [dot])
SUB SCAN FEED :

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 13 | 5 | 5 | 5 | 13 |
| ΣL | 0 | 5 | 10 | 15 | 28 | 33 | 38 | 43 | 56 |
| F=(ΣL)%keff | 0 | 5 | 2 | 7 | 4 | 1 | 6 | 3 | 0 |

Fig. 19(B)
RASTER NUMBERS OF EFFECTIVE RASTER LINES RECORDED
BY RESPECTIVE NOZZLES

| NOZZLE No. | \multicolumn{16}{c}{NUMBER OF SUB-SCAN FEED} |
|---|---|

| NOZZLE No. | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| @0  | . | . | . | . | . | . | . | 3 | 16 | 21 | 26 | 31 | 44 | 49 | 54 | 59 |
| $1  | . | . | . | . | . | . | 2' | 7' | 20' | 25' | 30' | 35' | 48' | 53' | 58' | 63' |
| @2  | . | . | . | . | . | 1 | 6 | 11 | 24 | 29 | 34 | 39 | 52 | 57 | 62 | 67 |
| $3  | . | . | . | . | 0' | 5' | 10' | 15' | 28' | 33' | 38' | 43' | 56' | 61' | 66' | 71' |
| @4  | . | . | . | . | 4 | 9 | 14 | 19 | 32 | 37 | 42 | 47 | 60 | 65 | 70 | 75 |
| $5  | . | . | . | . | 8' | 13' | 18' | 23' | 36' | 41' | 46' | 51' | 64' | 69' | 74' | 79' |
| @6  | . | . | . | . | 12 | 17 | 22 | 27 | 40 | 45 | 50 | 55 | 68 | 73 | 78 | 83 |
| $7  | . | . | . | 3' | 16' | 21' | 26' | 31' | 44' | 49' | 54' | 59' | 72' | 77' | 82' | 87' |
| @8  | . | . | 2 | 7 | 20 | 25 | 30 | 35 | 48 | 53 | 58 | 63 | 76 | 81 | 86 | 91 |
| $9  | . | 1' | 6' | 11' | 24' | 29' | 34' | 39' | 52' | 57' | 62' | 67' | 80' | 85' | 90' | 95' |
| @10 | 0 | 5 | 10 | 15 | 28 | 33 | 38 | 43 | 56 | 61 | 66 | 71 | 84 | 89 | 94 | 99 |
| $11 | 4' | 9' | 14' | 19' | 32' | 37' | 42' | 47' | 60' | 65' | 70' | 75' | 88' | 93' | 98' | 103' |
| @12 | 8 | 13 | 18 | 23 | 36 | 41 | 46 | 51 | 64 | 69 | 74 | 79 | 92 | 97 | 102 | 107 |
| $13 | 12' | 17' | 22' | 27' | 40' | 45' | 50' | 55' | 68' | 73' | 78' | 83' | 96' | 101' | 106' | 111' |

1, 2 ··· : EVEN PIXELS ARE TO BE RECORDED.
1', 2'··· : ODD PIXELS ARE TO BE RECORDED.

Fig. 20

NOZZLE NUMBERS FOR RECORDING RESPECTIVE RASTER LINES
(THIRD DOT RECORDING SCHEME)

| RASTER No. | No. of SUBSCAN even | No. of SUBSCAN odd | ADJOIN. even/odd | NUMBER OF SUB-SCAN FEED 0 | 1 | 2 | 3 | 4 | 5 | 6 | 7 | 8 | 9 | 10 | 11 | 12 |
|---|---|---|---|---|---|---|---|---|---|---|---|---|---|---|---|---|
| 0  | 0( -)  | 4( -)  | · ↓ | @10 | .  | .  | $3 |    |    |    |    |    |    |    |    |    |
| 1  | 5( 5)  | 1(-3)  | X · |     | $9 | .  | .  | @2 |    |    |    |    |    |    |    |    |
| 2  | 2(-3)  | 6( 5)  | · X |     |    | @8 | .  | .  | $1 |    |    |    |    |    |    |    |
| 3  | 7( 5)  | 3(-3)  | X ↓ |     |    |    | $7 | .  | .  | @0 |    |    |    |    |    |    |
| 4  | 4(-3)  | 0(-3)  | ↓ · | $11 | .  | .  | @4 |    |    |    |    |    |    |    |    |    |
| 5  | 1(-3)  | 5( 5)  | · X |     | @10| .  | .  | $3 |    |    |    |    |    |    |    |    |
| 6  | 6( 5)  | 2(-3)  | X · |     |    | $9 | .  | .  | @2 |    |    |    |    |    |    |    |
| 7  | 3(-3)  | 7( 5)  | ↓ X |     |    |    | @8 | .  | .  | $1 |    |    |    |    |    |    |
| 8  | 0(-3)  | 4(-3)  | · ↓ | @12 | .  | .  | $5 |    |    |    |    |    |    |    |    |    |
| 9  | 5( 5)  | 1(-3)  | X · |     | $11| .  | .  | @4 |    |    |    |    |    |    |    |    |
| 10 | 2(-3)  | 6( 5)  | · X |     |    | @10| .  | .  | $3 |    |    |    |    |    |    |    |
| 11 | 7( 5)  | 3(-3)  | X ↓ |     |    |    | $9 | .  | .  | @2 |    |    |    |    |    |    |
| 12 | 4(-3)  | 0(-3)  | ↓ · | $13 | .  | .  | @6 |    |    |    |    |    |    |    |    |    |
| 13 | 1(-3)  | 5( 5)  | · X |     | @12| .  | .  | $5 |    |    |    |    |    |    |    |    |
| 14 | 6( 5)  | 2(-3)  | X · |     |    | $11| .  | .  | @4 |    |    |    |    |    |    |    |
| 15 | 3(-3)  | 7( 5)  | · X |     |    |    | @10| .  | .  | $3 |    |    |    |    |    |    |
| 16 | 8( 5)  | 4(-3)  | X ↓ |     |    |    |    | $7 | .  | .  | @0 |    |    |    |    |    |
| 17 | 5(-3)  | 1(-3)  | ↓ · |     | $13| .  | .  | @6 |    |    |    |    |    |    |    |    |
| 18 | 2(-3)  | 6( 5)  | · X |     |    | @12| .  | .  | $5 |    |    |    |    |    |    |    |
| 19 | 7( 5)  | 3(-3)  | X · |     |    |    | $11| .  | .  | @4 |    |    |    |    |    |    |
| 20 | 4(-3)  | 8( 5)  | · X |     |    |    | @8 | .  | .  | $1 |    |    |    |    |    |    |
| 21 | 9( 5)  | 5(-3)  | X ↓ |     |    |    |    | $7 | .  | .  | @0 |    |    |    |    |    |
| 22 | 6(-3)  | 2(-3)  | ↓ · |     |    | $13| .  | .  | @6 |    |    |    |    |    |    |    |
| 23 | 3(-3)  | 7( 5)  | · X |     |    |    | @12| .  | .  | $5 |    |    |    |    |    |    |
| 24 | 8( 5)  | 4(-3)  | X · |     |    |    |    | $9 | .  | .  | @2 |    |    |    |    |    |
| 25 | 5(-3)  | 9( 5)  | · X |     |    |    |    | @8 | .  | .  | $1 |    |    |    |    |    |
| 26 | 10( 5) | 6(-3)  | X ↓ |     |    |    |    |    | $7 | .  | .  | @0 |    |    |    |    |
| 27 | 7(-3)  | 3(-3)  | ↓ · |     |    |    | $13| .  | .  | @6 |    |    |    |    |    |    |
| 28 | 4(-3)  | 8( 5)  | · X |     |    |    |    | @10| .  | .  | $3 |    |    |    |    |    |

@ : NOZZLES TO RECORD EVEN PIXELS
$ : NOZZLES TO RECORD ODD PIXELS

Fig. 21(A)
SCAN PARAMETERS FOR FOURTH DOT RECORDING SCHEME

NOZZLE PITCH k : 4 [dot]
NUMBER OF USED NOZZLES N : 14
NUMBER OF NOZZLE GROUPS M : 2
NUMBER OF EFFECTIVE NOZZLES Neff : 7
RECORDING START RASTER LINE NUMBER: 40
PIXEL POSITION TO BE RECORDED :

| NOZZLE No. | @0 | @1 | @2 | @3 | @4 | $5 | $6 | $7 | $8 | $9 |
|---|---|---|---|---|---|---|---|---|---|---|
| PIXEL POSITION | %3=0 | %3=0 | %3=0 | %3=0 | %3=0 | %3=1 | %3=1 | %3=1 | %3=1 | %3=1 |
| NOZZLE No. | #10 | #11 | #12 | #13 | #14 | | | | | |
| PIXEL POSITION | %3=2 | %3=2 | %3=2 | %3=2 | %3=2 | | | | | |

(EFFECTIVE NOZZLE PITCH keff : 4 [dot])

SUB SCAN FEED :

| NUMBER OF SUB-SCAN FEED | 0 | 1 | 2 | 3 | 4 |
|---|---|---|---|---|---|
| FEED AMOUNT L [dot] | 0 | 5 | 5 | 5 | 5 |
| ΣL | 0 | 5 | 10 | 15 | 20 |
| F =(ΣL)%keff | 0 | 1 | 2 | 3 | 0 |

Fig. 21(B)
RASTER NUMBERS OF EFFECTIVE RASTER LINES RECORDED
BY RESPECTIVE NOZZLES

| NOZZLE No. | \multicolumn{16}{c}{NUMBER OF SUB-SCAN FEED} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| @0 | . | . | . | . | . | . | . | . | . | . | . | 3 | 8 | 13 | 18 | 23 |
| @1 | . | . | . | . | . | . | . | . | . | . | 2 | 7 | 12 | 17 | 22 | 27 |
| @2 | . | . | . | . | . | . | . | . | . | 1 | 6 | 11 | 16 | 21 | 26 | 31 |
| @3 | . | . | . | . | . | . | . | . | 0 | 5 | 10 | 15 | 20 | 25 | 30 | 35 |
| @4 | . | . | . | . | . | . | . | . | 4 | 9 | 14 | 19 | 24 | 29 | 34 | 39 |
| $5 | . | . | . | . | . | . | . | 3' | 8' | 13' | 18' | 23' | 28' | 33' | 38' | 43' |
| $6 | . | . | . | . | . | . | 2' | 7' | 12' | 17' | 22' | 27' | 32' | 37' | 42' | 47' |
| $7 | . | . | . | . | . | 1' | 6' | 11' | 16' | 21' | 26' | 31' | 36' | 41' | 46' | 51' |
| $8 | . | . | . | . | 0' | 5' | 10' | 15' | 20' | 25' | 30' | 35' | 40' | 45' | 50' | 55' |
| $9 | . | . | . | . | 4' | 9' | 14' | 19' | 24' | 29' | 34' | 39' | 44' | 49' | 54' | 59' |
| #10 | . | . | . | 3" | 8" | 13" | 18" | 23" | 28" | 33" | 38" | 43" | 48" | 53" | 58" | 63" |
| #11 | . | . | 2" | 7" | 12" | 17" | 22" | 27" | 32" | 37" | 42" | 47" | 52" | 57" | 62" | 67" |
| #12 | . | 1" | 6" | 11" | 16" | 21" | 26" | 31" | 36" | 41" | 46" | 51" | 56" | 61" | 66" | 71" |
| #13 | 0" | 5" | 10" | 15" | 20" | 25" | 30" | 35" | 40" | 45" | 50" | 55" | 60" | 65" | 70" | 75" |
| #14 | 4" | 9" | 14" | 19" | 24" | 29" | 34" | 39" | 44" | 49" | 54" | 59" | 64" | 69" | 74" | 79" |

1, 2 ⋯ : (%3=0) PIXELS ARE TO BE RECORDED.
1', 2'⋯ : (%3=1) PIXELS ARE TO BE RECORDED.
1", 2"⋯ : (%3=2) PIXELS ARE TO BE RECORDED.

Fig. 22

NOZZLE NUMBERS FOR RECORDING RESPECTIVE RASTER LINES
(FOURTH DOT RECORDING SCHEME)

@ : NOZZLES TO RECORD (%3=0) PIXELS
$ : NOZZLES TO RECORD (%3=1) PIXELS
# : NOZZLES TO RECORD (%3=2) PIXELS

Fig. 23(A)
SCAN PARAMETERS FOR FIFTH DOT RECORDING SCHEME

NOZZLE PITCH k : 2 [dot]
NUMBER OF USED NOZZLES N : 20
NUMBER OF NOZZLE GROUPS M : 4
NUMBER OF EFFECTIVE NOZZLES Neff : 5
RECORDING START RASTER LINE NUMBER: 34
PIXEL POSITION TO BE RECORDED :

| NOZZLE No. | @0 | $1 | #2 | &3 | @4 | $5 | #6 | &7 | @8 | $9 |
|---|---|---|---|---|---|---|---|---|---|---|
| PIXEL POSITION | %4=0 | %4=1 | %4=2 | %4=3 | %4=0 | %4=1 | %4=2 | %4=3 | %4=0 | %4=1 |
| NOZZLE No. | #10 | &11 | @12 | $13 | #14 | &15 | @16 | $17 | #18 | &19 |
| PIXEL POSITION | %4=2 | %4=3 | %4=0 | %4=1 | %4=2 | %4=3 | %4=0 | %4=1 | %4=2 | %4=3 |

(EFFECTIVE NOZZLE PITCH keff : 16 [dot])
SUB SCAN FEED :

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 5 | 5 | 5 | 5 | 5 |
| ΣL | 0 | 5 | 10 | 15 | 20 | 25 | 30 | 35 | 40 |
| F =(ΣL)%keff | 0 | 5 | 10 | 15 | 4 | 9 | 14 | 3 | 8 |

(THE FEED AMOUNTS L FOR THE OTHER EIGHT SUB SCANS IN ONE CYBLE ARE THE SAME AS ABOVE.)

Fig. 23(B)
RASTER NUMBERS OF EFFECTIVE RASTER LINES RECORDED
BY RESPECTIVE NOZZLES

| NOZZLE No. | \multicolumn{16}{c}{NUMBER OF SUB-SCAN FEED} |
|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 |
| @0 | . | . | . | . | . | . | . | 1 | 6 | 11 | 16 | 21 | 26 | 31 | 36 | 41 |
| $1 | . | . | . | . | . | . | . | 3' | 8' | 13' | 18' | 23' | 28' | 33' | 38' | 43' |
| %2 | . | . | . | . | . | . | 0" | 5" | 10" | 15" | 20" | 25" | 30" | 35" | 40" | 45" |
| #3 | . | . | . | . | . | . | 2` | 7` | 12` | 17` | 22` | 27` | 32` | 37` | 42` | 47` |
| @4 | . | . | . | . | . | . | 4 | 9 | 14 | 19 | 24 | 29 | 34 | 39 | 44 | 49 |
| $5 | . | . | . | . | . | 1' | 6' | 11' | 16' | 21' | 26' | 31' | 36' | 41' | 46' | 51' |
| %6 | . | . | . | . | . | 3" | 8" | 13" | 18" | 23" | 28" | 33" | 38" | 43" | 48" | 53" |
| #7 | . | . | . | . | 0` | 5` | 10` | 15` | 20` | 25` | 30` | 35` | 40` | 45` | 50` | 55` |
| @8 | . | . | . | . | 2 | 7 | 12 | 17 | 22 | 27 | 32 | 37 | 42) | 47 | 52 | 57 |
| $9 | . | . | . | . | 4' | 9' | 14' | 19' | 24' | 29' | 34' | 39' | 44' | 49' | 54' | 59' |
| %10 | . | . | . | 1" | 6" | 11" | 16" | 21" | 26" | 31" | 36" | 41" | 46" | 51" | 56" | 61" |
| #11 | . | . | . | 3` | 8` | 13` | 18` | 23` | 28` | 33` | 38` | 43` | 48` | 53` | 58` | 63` |
| @12 | . | . | 0 | 5 | 10 | 15 | 20 | 25 | 30 | 35 | 40 | 45 | 50 | 55 | 60 | 65 |
| $13 | . | . | 2' | 7' | 12' | 17' | 22' | 27' | 32' | 37' | 42' | 47 | 52 | 57 | 62 | 67 |
| %14 | . | . | 4" | 9" | 14" | 19" | 24" | 29" | 34" | 39" | 44" | 49" | 54" | 59" | 64" | 69" |
| #15 | . | 1` | 6` | 11` | 16` | 21` | 26` | 31` | 36` | 41` | 46` | 51` | 56` | 61` | 66` | 71` |
| @16 | . | 3 | 8 | 13 | 18 | 23 | 28 | 33 | 38 | 43 | 48 | 53 | 58 | 63 | 68 | 73 |
| $17 | 0' | 5' | 10' | 15' | 20' | 25' | 30' | 35' | 40' | 45' | 50' | 55' | 60' | 65' | 70' | 75' |
| %18 | 2" | 7" | 12" | 17" | 22" | 27" | 32" | 37" | 42" | 47" | 52" | 57" | 62" | 67" | 72" | 77" |
| #19 | 4` | 9` | 14` | 19` | 24` | 29` | 34` | 39` | 44` | 49` | 54` | 59` | 64` | 69` | 74` | 79` |

1, 2 ··· : (%4=0) PIXELS ARE TO BE RECORDED.
1', 2'··· : (%4=1) PIXELS ARE TO BE RECORDED.
1", 2"··· : (%4=2) PIXELS ARE TO BE RECORDED.
1`, 2`··· : (%4=3) PIXELS ARE TO BE RECORDED.

Fig. 24 NOZZLE NUMBERS FOR RECORDING RESPECTIVE RASTER LINES (FIFTH DOT RECORDING SCHEME)

Fig. 25
SCAN PARAMETERS FOR SIXTH DOT RECORDING SCHEME

NOZZLE PITCH k : 8 [dot]
NUMBER OF USED NOZZLES N : 10
NUMBER OF NOZZLE GROUPS M : 2
NUMBER OF EFFECTIVE NOZZLES Neff : 5
RECORDING START RASTER LINE NUMBER: 68
PIXEL POSITION TO BE RECORDED :

| NOZZLE No. | @0 | $1 | @2 | $3 | @4 | $5 | @6 | $7 | @8 | $9 |
|---|---|---|---|---|---|---|---|---|---|---|
| PIXEL POSITION | even | odd | even | odd | even | odd | even | odd | even | odd |

(EFFECTIVE NOZZLE PITCH keff : 16 [dot])
SUB SCAN FEED :

| NUMBER OF SUB-SCAN FEED | 0 | 1 | 2 | 3 | 4 | 5 | 6 | 7 | 8 |
|---|---|---|---|---|---|---|---|---|---|
| FEED AMOUNT L [dot] | 0 | 5 | 5 | 5 | 5 | 5 | 5 | 5 | 5 |
| $\Sigma L$ | 0 | 5 | 10 | 15 | 20 | 25 | 30 | 35 | 40 |
| $F = (\Sigma L)\%keff$ | 0 | 5 | 10 | 15 | 4 | 9 | 14 | 3 | 8 |
| NUMBER OF SUB-SCAN FEED | | 9 | 10 | 11 | 12 | 13 | 14 | 15 | 16 |
| FEED AMOUNT L [dot] | | 5 | 5 | 5 | 5 | 5 | 5 | 5 | 5 |
| $\Sigma L$ | | 45 | 50 | 55 | 60 | 65 | 70 | 75 | 80 |
| $F = (\Sigma L)\%keff$ | | 13 | 2 | 7 | 12 | 1 | 6 | 11 | 0 |

Fig. 26
RASTER NUMBERS OF EFFECTIVE RASTER LINES RECORDED
BY RESPECTIVE NOZZLES IN SIXTH DOT RECORDING SCHEME

| NOZZLE No. | NUMBER OF SUB-SCAN FEED | | | | | | | | | | | | | | | | | | | | | | |
|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| @0 | . | . | . | . | . | . | . | . | . | . | . | . | . | . | 2 | 7 | 12 | 17 | 22 | 27 | 32 | 37 | 42 |
| @1 | . | 1' | 6' | . | . | . | . | . | . | . | . | . | . | 5 | 10 | 15 | 20 | 25 | 30 | 35 | 40 | 45 | 50 |
| @2 | . | 9' | 14' | . | . | . | . | . | . | . | . | 3 | 8 | 13 | 18 | 23 | 28 | 33 | 38 | 43 | 48 | 53 | 58 |
| @3 | . | . | . | 3' | . | . | . | . | . | . | . | 11 | 16 | 21 | 26 | 31 | 36 | 41 | 46 | 51 | 56 | 61 | 66 |
| @4 | . | . | . | 11' | . | . | . | . | . | 6 | 14 | 19 | 24 | 29 | 34 | 39 | 44 | 49 | 54 | 59 | 64 | 69 | 74 |
| $5 | . | . | . | 19' | 0' | 5' | 2' | 7' | 4 | 9 | 22 | 27 | 32 | 37 | 42 | 47 | 52 | 57 | 62 | 67 | 72 | 77 | 82' |
| $6 | . | . | . | . | 8' | 13' | 10' | 15' | 12 | 17 | 30 | 35 | 40 | 45 | 50 | 55 | 60 | 65 | 70 | 75 | 80' | 85' | 90' |
| $7 | . | . | . | . | 16' | 21' | 18' | 23' | 20 | 25 | 38 | 43 | 48 | 53 | 58 | 63 | 68 | 73' | 78' | 83' | 88' | 93' | 98' |
| $8 | . | . | . | . | 24' | 29' | 26' | 31' | 28 | 33 | 46 | 51 | 56 | 61 | 66 | 71 | 76' | 81' | 86' | 91' | 96' | 101' | 106' |
| $9 | 4' | . | . | . | . | . | 34' | 39' | 36 | 41 | 49 | 54 | 59 | 64 | 69 | 74 | 79 | 84' | 89' | 94' | 99' | 104' | 109' | 114' |

1, 2 ⋯ : EVEN PIXELS ARE TO BE RECORDED.
1', 2' ⋯ : ODD PIXELS ARE TO BE RECORDED.

Fig. 27

NOZZLE NUMBERS FOR RECORDING RESPECTIVE RASTER LINES
(SIXTH DOT RECORDING SCHEME)

@ : NOZZLES TO RECORD EVEN PIXELS
$ : NOZZLES TO RECORD ODD PIXELS

CLASSIFICATION OF DOT POSITIONS

DOT RECORDING WITH PLURAL NOZZLE GROUPS

BACKGROUND OF THE INVENTION

1. Field of the Invention

The present invention relates to a technique of recording dots on the surface of a printing medium with a dot recording head having a plurality of nozzle groups.

2. Description of the Related Art

Serial scan-type printers and drum scan-type printers are dot recording devices which record dots with a recording head while carrying out scans both in a main scanning direction and a sub-scanning direction. There is a technique called the "interlace scheme", which is taught by U.S. Pat. No. 4,198,642 and Japanese Patent Laid-Open Gazette No. 53-2040, for improving the image quality of printers of this type, especially ink jet printers.

FIG. 35 is a diagram for explaining an example of the interlace scheme. In this specification, the following parameters are used to define a printing scheme.

N: Number of nozzles;
k: Nozzle pitch [dots];
s: Number of scan repeats;
D: Nozzle density [nozzles/inch];
L: Sub-scanning pitch [dots] or [inch];
w: Dot pitch [inch].

The number of nozzles N is the number of nozzles actually used to form dots. In the example of FIG. 35, N=3. The nozzle pitch k is the interval between the centers of the recording head nozzles expressed in units of the recorded image pitch (dot pitch w). In the example of FIG. 35, k=2. The number of scan repeats s is the number of main scans in which all dot positions on a main scanning line are serviced. In the example of FIG. 35, s=1, i.e., all dot positions on a main scanning line are serviced in a single main scan. When s is 2 or greater, the dots are formed intermittently in the main scanning direction. This will be explained in detail later. The nozzle density D (nozzle/inch) is the number of nozzles per inch in the nozzle array of the recording head. The sub-scanning pitch L (inch) is the distance moved in 1 sub-scan. The dot pitch w (inch) is the pitch of the dots in the recorded image. In general, it holds that $w=1/(D \cdot k)$, $k=1/(D \cdot w)$.

The circles containing two-digit numerals in FIG. 35 indicate dot recording positions. As indicated in the legend, the numeral on the left in each circle indicates the nozzle number and the numeral on the right indicates the recording order (the number of the main scan in which it was recorded).

The interlace scheme shown in FIG. 35 is characterized by the configuration of the nozzle array of the recording head and the sub-scanning method. Specifically, in the interlace scheme, the nozzle pitch k indicating the interval between the centers of adjacent nozzles is defined as an integer not smaller than 2, while the number of nozzles N and the nozzle pitch k are selected as integers which are relatively prime. Further, sub-scanning pitch L is set at a constant value given by $N/(D \cdot k)$. In this specification, the phrase "A and B are relatively prime" or "A and B are prime to each other" means that the greatest common divisor of A and B is one.

The interlace scheme makes irregularities in nozzle pitch and ink jetting Feature to thin out over the recorded image. Because of this, it improves image quality by mitigating the effect of any irregularity that may be present in the nozzle pitch, the jetting Feature and the like.

The "overlap scheme", also known as the "multi-scan scheme", taught for example by Japanese Patent Laid-Open Gazette No.3-207665 and Japanese Patent Publication Gazette No. 4-19030 is another technique used to improve image quality in color ink jet printers.

FIG. 36 is a diagram for explaining an example of the overlap scheme. In the overlap scheme, 8 nozzles are divided into 2 nozzle sets. The first nozzle set is made up of 4 nozzles having even nozzle numbers (left numeral in each circle) and the second nozzle set is made up of 4 nozzles having odd nozzle numbers. In each main scan, the nozzle sets are each intermittently driven to form dots in the main scanning direction once every (s) dots. Since s=2 in the example of FIG. 36, a dot is formed at every second dot position. The timing of the driving of the nozzle sets is controlled so that the each nozzle set forms dots at different positions from the other in the main scanning direction. In other words, as shown in FIG. 36, the recording positions of the nozzles of the first nozzle set (nozzles number 8, 6, 4, 2) and those of the nozzles of the second nozzle set (nozzles number 7, 5, 3, 1) are offset from each other by 1 dot in the main scanning direction. This kind of scanning is conducted multiple times with the nozzle driving times being offset between the nozzle sets during each main scan to form all dots on the main scanning lines.

In the overlap scheme, the nozzle pick k is set at an integer no less than 2, as in the interlace scheme. However, the number of nozzles N and the nozzle pitch k are not relatively prime, but the nozzle pitch k and the value N/s, which is obtained by dividing the number of nozzles N by the number of scan repeats s, are set at relatively prime integers instead.

In the overlap scheme, the dots of each main scanning line are not all recorded by the same nozzle but by multiple nozzles. Even when the nozzle characteristics (pitch, jetting characteristics etc.) are not completely uniform, therefore, enhanced image quality can be obtained because the characteristics of the individual nozzles is prevented from affecting the entire main scanning line.

The conventional dot recording schemes have strict restrictions in the number of nozzles N and the nozzle pitch k and do not have so much flexibility accordingly.

SUMMARY OF THE INVENTION

Accordingly, an object of the present invention is to provide a technique that enables to flexibly construct dot recording schemes.

In the present invention, a plurality of dot-forming elements in use are divided into M element groups, each element group including Neff dot-forming elements, where Neff is an integer of not less than 2 and M is an integer of not less than 2. Moreover, a plurality of dot positions on each raster line in a main scanning direction are classified into M different types of dot positions. The Neff dot-forming elements included in each element group execute dot recording at one identical type of dot positions among the M different types of dot positions, and the M element groups respectively execute the dot recording at different types of dot positions, to thereby execute the dot recording at all the different types of dot positions in an effective recording area of the printing medium.

There are a large number of available combinations of the dot-forming element classifications and the dot position classifications. Accordingly, a favorable dot recording scheme can be flexibly constructed by selecting an appropriate combination in terms of the image quality and the recording speed.

It is not required to use all the dot-forming elements mounted on the dot recording head, but only part of the dot-forming elements may be used for actual recording. The term "plurality of dot-forming elements" means the dot-forming elements actually used.

The Neff dot-forming elements included in each element group may be arranged at a fixed pitch measured in the sub-scanning direction, the fixed pitch being common to the M element groups. In this case, common sub-scan feeds can be applied to the M element groups so as to record all the raster lines in the effective recording area. This ensures effective fast scans.

The plurality of dot-forming elements in use may be divided into the M element groups that are sequentially aligned in the sub-scanning direction to be separated from each other. This arrangement sets the minimum possible value to the pitch of the dot-forming elements included in each element group and thereby reduces an accumulated sub-scan feed error.

Alternatively, the plurality of dot-forming elements in use may be sequentially allocated to the M element groups one by one along the sub-scanning direction. This arrangement sets a greater value than the minimum possible value to the pitch of the dot-forming elements included in each element group and thereby enhances the degree of freedom in selection of the parameters that effect the sub-scan feeds to execute dot recording on all the raster lines in the effective recording area. Accordingly a desired dot recording scheme can be constructed more flexibley.

It is preferable to provide a switching unit that selects one of a plurality of classifications which classify the plurality of dot-forming elements in use into the M element groups. This unit enables a plurality of classification methods for the dot-forming elements with respect to the same dot-forming element array, thereby further ensuring the more flexible dot recording scheme.

The present invention can be embodied in various forms such as a dot recording apparatus, a dot recording method, a computer program product for implementing the functions of the apparatus, and a computer data signal embodied in a carrier wave.

An apparatus for recording dots on a surface of a printing medium comprises: a dot recording head having a dot-forming element array, the dot-forming array having a plurality of dot-forming elements which form a plurality of dots of an identical color that are substantially aligned in a sub-scanning direction; a main scan driving unit that moves at least one of the dot record head and the printing medium to carry out a main scan; a head driving unit that use at least part of the plurality of dot-forming elements to form dots in the course of the main scan; a sub-scan driving unit that moves at least one of the dot recording head and the printing medium every time when the main scan is completed, thereby carrying out sub-scan; and a control unit that controls the above unit.

A method for recording dots on a surface of a printing medium comprises the steps of: (a) carrying out a main scan by moving at least one of the dot record head and the printing medium; (b) executing dot recording with a dot recording head having a dot-forming element array, the dot-forming array having a plurality of dot-forming elements which form a plurality of dots of an identical color that are substantially aligned in a sub-scanning direction, at least part of the plurality of dot-forming elements being used to form dots in the course of the main scan; and (c) carrying out a sub-scan by moving at least one of the dot recording head and the printing medium every time when the main scan is completed.

A computer program product, for use in a dot recording apparatus for recording dots on a surface of a printing medium, comprises: a computer readable medium; and a computer program stored on the computer readable medium, the computer program comprising: a first program for causing a computer to carrying out a main scan by moving at least one of the dot record head and the printing medium; a second program for causing the computer to execute dot recording with the dot recording head while using at least part of the plurality of dot-forming elements to form dots in the course of the main scan; and a third program for causing the computer to carry out a sub-scan by moving at least one of the dot recording head and the printing medium every time when the main scan is completed;

These and other objects, features, aspects, and advantages of the present invention will become more apparent from the following detailed description of the preferred embodiments with the accompanying drawings.

BRIEF DESCRIPTION OF THE DRAWINGS

FIG. 5(A) shows an arrangement of ink jet nozzles in the ink spout heads 61–64;

FIG. 5(B) shows an arrangement of dots recorded by the ink jet nozzles;

FIGS. 6(A) and 6(B) show the fundamental conditions of the general dot recording scheme when the number of scan repeats s is equal to 1;

FIGS. 7(A) and 7(B) show the fundamental conditions of the general dot recording scheme when the number of scan repeats s is not less than 2;

FIGS. 9(A) and 9(B) show the scanning parameters and the raster numbers of the effective raster lines recorded by the respective nozzles in the dot recording scheme of the first embodiment;

FIG. 10 shows the nozzle numbers of the nozzles that record the effective raster lines in the dot recording scheme of the first embodiment;

FIGS. 11(A) and 11(B) show the scanning parameters and the raster numbers of the effective raster lines recorded by the respective nozzles in the dot recording scheme of a first control example;

FIG. 12 shows the nozzle numbers of the nozzles that record the effective raster lines in the dot recording scheme of the first control example;

FIGS. 13(A) and 13(B) show the scanning parameters and the raster numbers of the effective raster lines recorded by the respective nozzles in the dot recording scheme of a second control example;

FIG. 14 shows the nozzle numbers of the nozzles that record the effective raster lines in the dot recording scheme of the second control example;

FIGS. 16(a)–16(h) are timing charts showing the operations of the circuit of FIG. 15;

FIGS. 17(A) and 17(B) show the scanning parameters and the raster numbers of the effective raster lines recorded by the respective nozzles in the dot recording scheme of a second embodiment according to the present invention;

FIG. 18 shows the nozzle numbers of the nozzles that record the effective raster lines in the dot recording scheme of the second embodiment;

FIGS. 19(A) and 19(B) show the scanning parameters and the raster numbers of the effective raster lines recorded by the respective nozzles in the dot recording scheme of a third embodiment according to the present invention;

FIG. 20 shows the nozzle numbers of the nozzles that record the effective raster lines in the dot recording scheme of the third embodiment;

FIGS. 21(A) and 21(B) show the scanning parameters and the raster numbers of the effective raster lines recorded by the respective nozzles in the dot recording scheme of a fourth embodiment according to the present invention;

FIG. 22 shows the nozzle numbers of the nozzles that record the effective raster lines in the dot recording scheme of the fourth embodiment;

FIGS. 23(A) and 23(B) show the scanning parameters and the raster numbers of the effective raster lines recorded by the respective nozzles in the dot recording scheme of a fifth embodiment according to the present invention;

FIG. 24 shows the nozzle numbers of the nozzles that record the effective raster lines in the dot recording scheme of the fifth embodiment;

FIG. 25 shows the scanning parameters in the dot recording scheme of a sixth embodiment according to the present invention;

FIG. 26 shows the raster numbers of the effective raster lines recorded by the respective nozzles in the sixth embodiment;

FIG. 27 shows the nozzle numbers of the nozzles that record the effective raster lines in the dot recording scheme of the sixth embodiment;

DESCRIPTION OF THE PREFERRED EMBODIMENT

A. Structure of Apparatus

Figure 1:
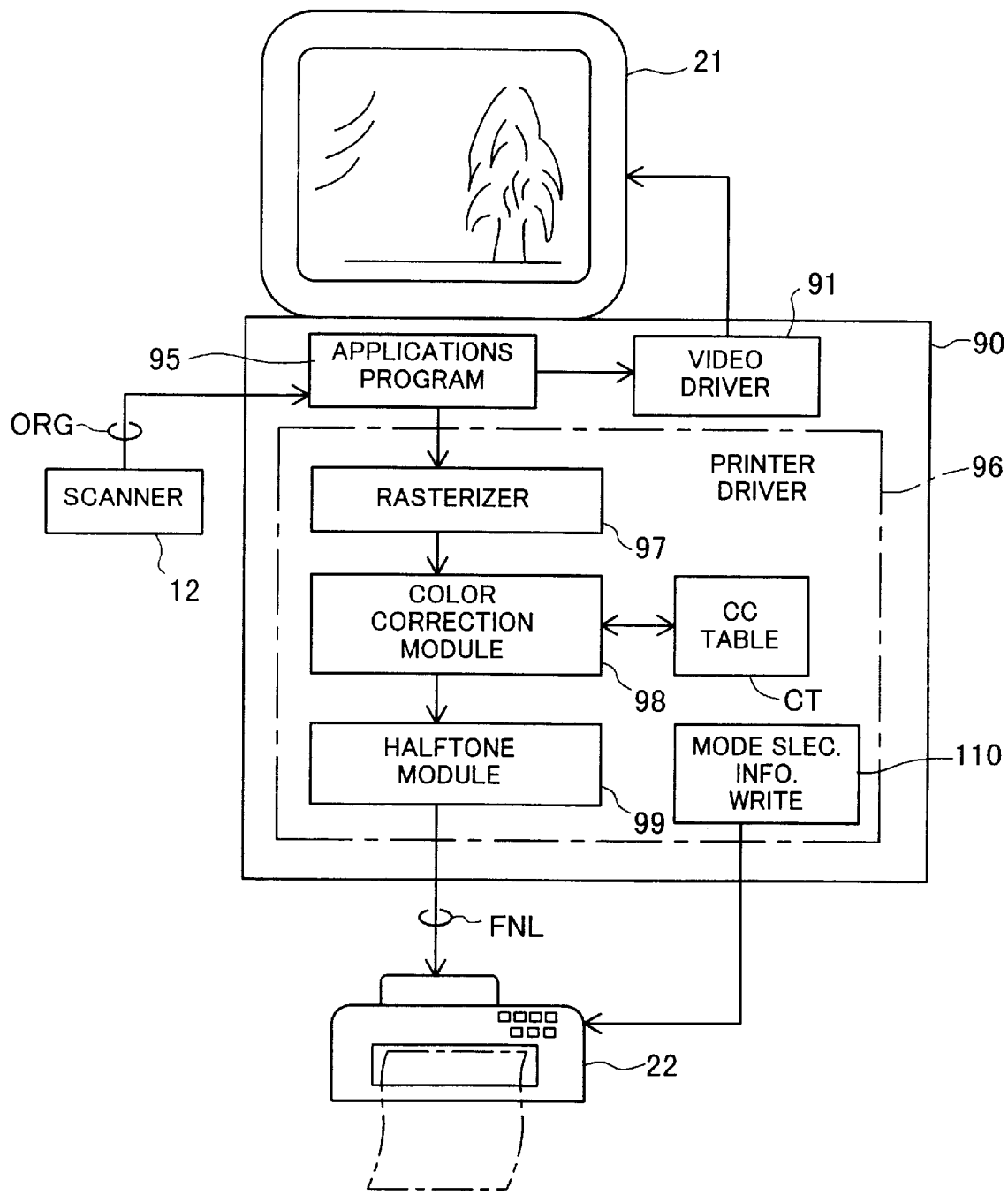
FIG. 1 is a block diagram schematically illustrating the structure of an image processing system according to the present invention.

FIG. 1 is a block diagram illustrating the structure of a color image processing system embodying the present invention. The color image processing system includes a scanner 12, a personal computer 90, and a color printer 22. The personal computer 90 includes a color display 21. The scanner 21 captures color image data of a color original, and supplies the original color image data ORG, including R, G, and B components, to the computer 90.

The computer 90 is provided therein with CPU, RAM, and ROM (not shown), and an applications program 95 runs under a specific operating system. A video driver 91 and a printer driver 96 are incorporated in the operating system, and final color image data FNL of the applications program 95 are output through these drivers. The applications program 95 used to, for example, retouch an image, reads an image from the scanner, execute a prescribed processing, and displays the image on the CRT display 93 through the video driver 91. When the applications program 95 outputs a printing instruction, the printer driver 96 receives image information from the applications program 95 and converts the input image information to printing signals for the printer 22. (The printing signals are binarized signals for the respective colors of C, M, Y, and K.) In the example of FIG. 1, the printer driver 96 includes: a rasterizer 97 for converting the color image data processed by the applications program 95 to dot-based image data; a color correction module 98 for executing color correction on the dot-based image data according to the ink colors of C, M, and Y used by the printer 22 and the colorimetric characteristics of the printer 22; a color correction table CT referred to by the color correction module 98; a halftone module 99 for generating halftone image data, which represents image density in a particular area by on/off of ink in each dot, from the color-corrected image data; and a mode selection writing module 110 for writing mode selection information, which will be described later, into a memory in the color printer 22.

Figure 2:
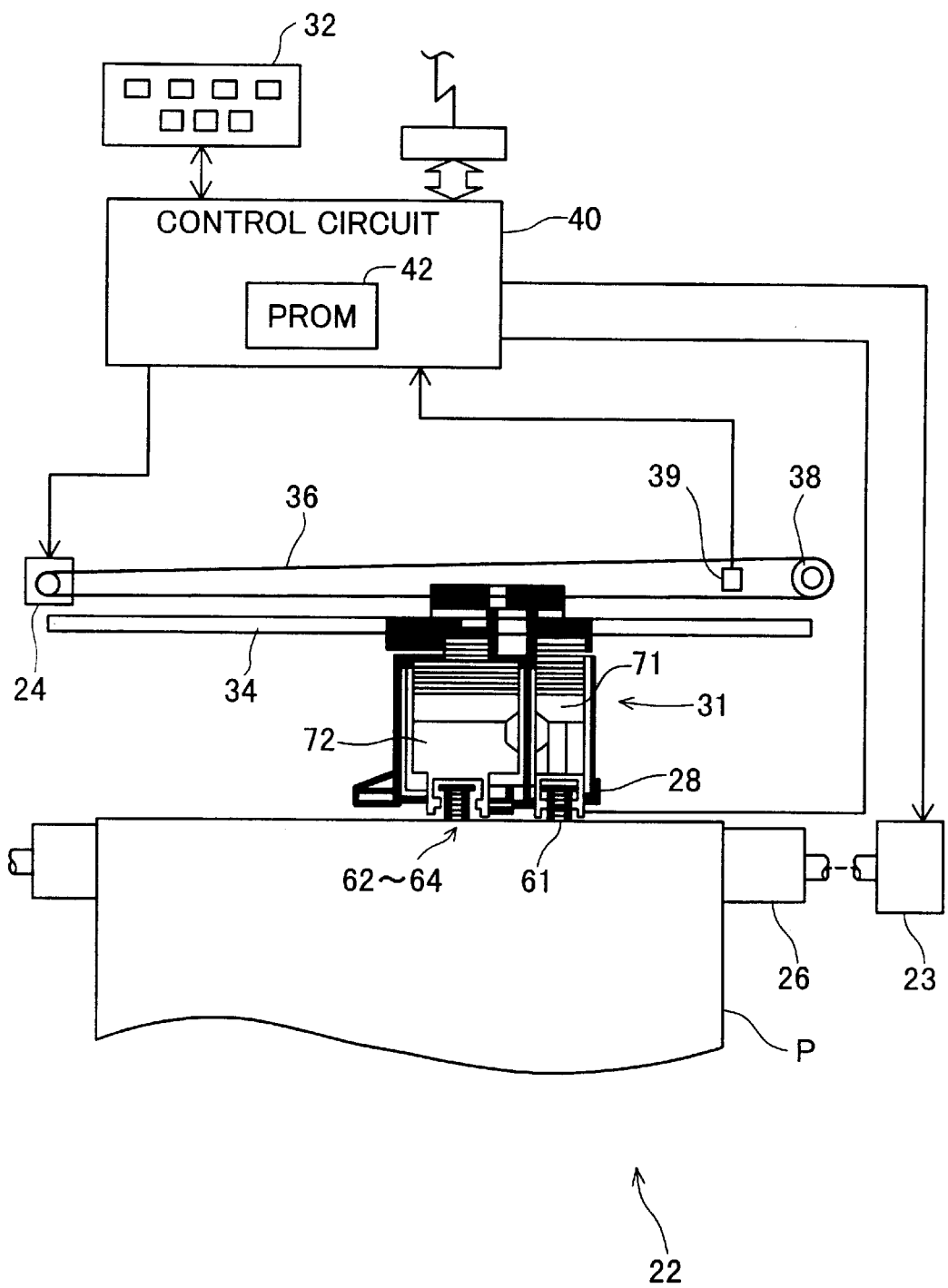
FIG. 2 schematically illustrates the structure of a color printer 22 as one example of the image output unit.

FIG. 2 schematically illustrates the structure of the printer 22. The printer 22 has a mechanism for feeding a sheet of paper P by means of a sheet feed motor 23, a mechanism for reciprocating a carriage 31 along the axis of a platen 26 by means of a carriage motor 24, a mechanism for driving a print head 28 mounted on the carriage 31 to control discharge of ink and formation of dots, and a control circuit 40 for transmitting signals to and from the sheet feed motor 23, the carriage motor 24, the print head 28, and a control panel 32.

A black ink cartridge 71 and a color ink cartridge 72 for storing three color inks, that is, cyan, magenta, and yellow, may be mounted on the carriage 31 of the printer 22. Four ink discharge heads 61–64 are formed on the print head 28 that is disposed in the lower portion of the carriage 31, and ink supply conduits 65 (see FIG. 3) are formed in the bottom portion of the carriage 31 for leading supplies of ink from ink tanks to the respective ink discharge heads 61–64. When the black ink cartridge 71 and the color ink cartridge 72 are attached downward to the carriage 31, the ink supply conduits 65 are inserted into connection apertures (not shown) formed in the respective cartridges. This enables supplies of ink to be fed from the respective ink cartridges to the ink discharge heads 61–64.

Figure 3:
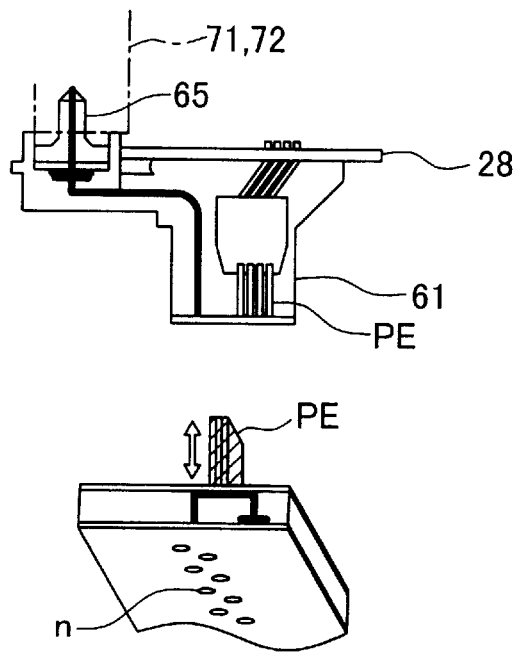
FIG. 3 shows the structure of the print head 28.

The following briefly describes the mechanism of discharging ink. When the ink cartridges 71 and 72 are attached to the carriage 31, inks in the ink cartridges 71 and 72 are sucked out through the ink supply conduits 65 by capillarity and are led to the ink discharge heads 61–64 formed in the print head 28 arranged in the lower portion of the carriage 31 as shown in FIG. 3. When the ink cartridges 71 and 72 are attached to the carriage 31, a pump works to suck first supplies of ink into the respective ink discharge heads 61–64. In this embodiment, the structures of the pump for suction and a cap for covering the print head 28 during the suction are not illustrated nor described specifically.

Figure 4:
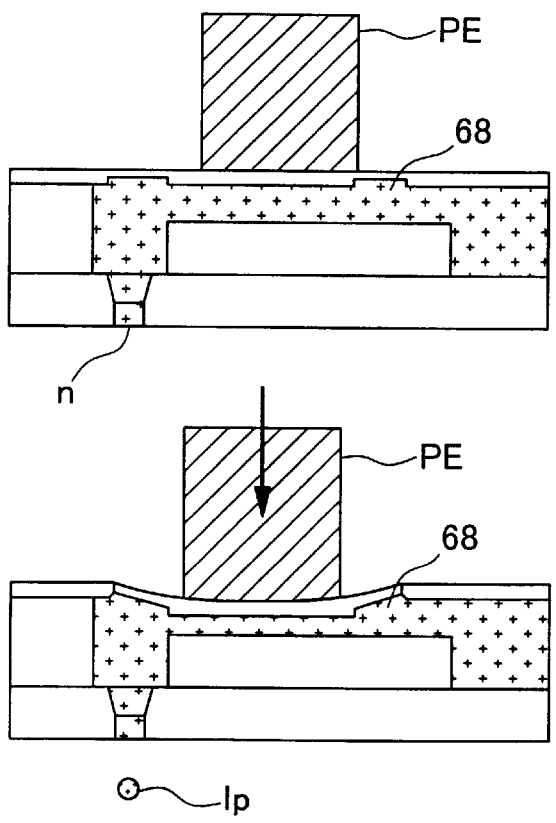
FIG. 4 shows the principle of jetting ink.

An array of thirty-two nozzles "n" is formed in each of the ink discharge heads 61–64 as shown in FIG. 3. A piezoelectric element PE, which is one of electrically distorting elements and has an excellent response, is provided for each nozzle "n". FIG. 4 illustrates a configuration of the piezoelectric element PE and the nozzle "n". The piezoelectric element PE is disposed at a position that comes into contact with an ink conduit 80 for leading ink to the nozzle "n". As is known, the piezoelectric element PE has a crystal structure that is subjected to a mechanical stress due to application of a voltage and thereby carries out extremely high-speed conversion of electrical energy to mechanical energy. In this embodiment, application of a voltage between electrodes on either ends of the piezoelectric element PE for a predetermined time period causes the piezoelectric element PE to extend for the predetermined time period and deform one side wall of the ink conduit 80 as shown in the lower part of FIG. 4. The volume of the ink conduit 80 is reduced with an extension of the piezoelectric element PE, and a certain amount of ink corresponding to the reduced volume is sprayed as ink particles Ip from the ends of the nozzle "n" at a high speed. The ink particles Ip soak into the sheet of paper P set on the platen 26, so as to reproduce a print.

In the printer 22 of the embodiment having the hardware structure discussed above, the sheet feed motor 23 rotates the platen 26 and the other related rollers to feed the printing paper P. The carriage motor 24 drives and reciprocates the carriage 31, simultaneously with actuation of the piezoelectric elements PE on the respective ink discharge heads 61–64 of the print head 28. The printer 22 accordingly sprays the respective color inks and forms a multi-color image on the printing paper P. Concrete arrangements of the nozzles in the respective ink discharge heads 61–64 will be discussed later.

The mechanism for feeding the printing paper P includes a gear train (not shown) for transmitting rotations of the sheet feed motor 23 to the platen 26 as well as a sheet feed roller (not shown). The mechanism for reciprocating the carriage 31 includes a sliding shaft 34 arranged in parallel with the axis of the platen 26 for slidably supporting the carriage 31, a pulley 38, an endless drive belt 36 spanned between the carriage motor 24 and the pulley 38, and a position sensor 39 for detecting the position of the origin of the carriage 31.

The control circuit 40 includes a CPU (not shown), main memories having a ROM and a RAM (not shown), and a programmable ROM (PROM) 42, which is a rewritable non-volatile memory. The PROM 42 stores dot recording mode information including parameters with respect to a plurality of dot recording modes. The "dot recording mode" denotes a dot recording scheme defined by parameters such as the number of actually used nozzles N, classification of used nozzles into M nozzle groups, classification of dot positions on each raster line, and the sub-scan feed amount L. In the specification hereof, the terms "recording scheme" and "recording mode" have substantially the same meanings. Concrete examples of the dot recording modes and their related parameters will be described later. Mode selection information is also stored in the PROM 42 to select a desired mode among the plurality of dot recording modes. For example, when the PROM 42 can store sixteen pieces of dot recording mode information, the mode selection information consists of four-bit data.

The dot recording mode information is read by the printer driver 96 from the PROM 42 when the printer driver 96 (FIG. 1) is installed at the startup of the computer 90. In more concrete terms, the printer driver 96 reads the dot recording mode information corresponding to a desired dot recording mode specified by the mode selection information from the PROM 42. The processes in the rasterizer 97 and the halftone module 99 as well as the main scans and sub-scans are carried out according to the dot recording mode information.

The PROM 42 may be any rewritable non-volatile memory and is, for example, an EEPROM or a flash memory. The dot recording mode information may be stored in a non-rewritable ROM, while it is preferable that the mode selection information is stored in the rewritable non-volatile memory. Plural sets of dot recording mode information may be stored in a storage device other than the PROM 42 or alternatively in the printer driver 96.

FIGS. 5(A) shows an arrangement of ink jet nozzles in the ink discharge heads 61–64. The first head 61 has a nozzle array for jetting black ink. Similarly the second through the fourth heads 62–64 respectively have nozzle arrays for jetting cyan, magenta, and yellow inks. These four nozzle arrays have identical positions in the sub-scanning direction.

Each of the four nozzle arrays includes 32 nozzles n arranged in a zigzag manner with a constant nozzle pitch k in the sub-scanning direction. The 32 nozzle n included in each nozzle array may be arranged in alignment, instead of in the zigzag manner. The zigzag arrangement as shown in FIG. 5(A), however, has the advantage of being able to set a smaller nozzle pitch k in the manufacturing process.

FIG. 5(B) shows an arrangement of a plurality of dots formed by one nozzle array. In this embodiment, driving signals are supplied to the piezoelectric elements PE (FIG. 4) of the respective nozzles in order to cause a plurality of dots formed by one nozzle array to be arranged substantially in alignment in the sub-scanning direction, regardless of the arrangement of the ink nozzles; that is, whether the nozzles are arranged in zigzag or in alignment. By way of example, it is assumed that the nozzles are arranged in zigzag as shown in FIG. 5(A) and that the head 61 is scanned rightward in the drawing to form dots. In this case, a group of preceding nozzles 100, 102, . . . receive driving signals at an earlier timing by d/v [second] than a group of following nozzles 101, 103 . . . Here, d [inch] denotes a pitch between the two nozzle groups in the head 61(See FIG. 5(A)), and v [inch/second] denotes the scanning speed of the head 61. A plurality of dots formed by one nozzle array are accordingly arranged in alignment in the sub-scanning direction. As described later, all of the plural nozzles provided in each of the heads 61–64 are not always used, but only part of the nozzles may be used according to the dot recording scheme.

The nozzle array in each ink discharge head shown in FIG. 5(A) corresponds to a dot forming element array of the present invention. The carriage feed mechanism including the carriage motor 24 shown in FIG. 2 corresponds to the main scan driving unit of the present invention, and the sheet feed mechanism including the sheet feed motor 23 corresponds to the sub-scan driving unit. The circuitry including the piezoelectric elements PE for the nozzles corresponds to the head driving unit of the present invention. The control circuit 40 and the printer driver 96 (FIG. 1) as a whole correspond to the control unit of the present invention.

B. Basic Conditions of Middle Area Recording Scheme

Before describing the dot recording schemes used in the embodiment of the present invention, the following describes basic conditions required for general recording schemes.

FIGS. 6(A) and 6(B) show basic conditions of a general dot recording scheme when the number of scan repeats s is equal to one. FIG. 6(A) illustrates an example of sub-scan feeds with four nozzles, and FIG. 6(B) shows parameters of the dot recording scheme. In the drawing of FIG. 6(A), solid circles including numerals indicate the positions of the four nozzles in the sub-scanning direction after each sub-scan feed. The encircled numerals 0–3 denote the nozzle numbers. The four nozzles are shifted in the sub-scanning direction every time when one main scan is concluded. Actually, however, the sub-scan feed is executed by feeding a printing paper with the sheet feed motor 23 (FIG. 2).

As shown on the left-hand side of FIG. 6(A), the sub-scan feed amount L is fixed to four dots. On every sub-scan feed, the four nozzles are shifted by four dots in the sub-scanning direction. When the number of scan repeats s is equal to one, each nozzle can record all dots (pixels) on the raster line. The right-hand side of FIG. 6(A) shows the nozzle numbers of the nozzles which record dots on the respective raster lines. There are non-serviceable raster lines above or below those raster lines that are drawn by the broken lines, which extend rightward (in the main scanning direction) from a circle representing the position of the nozzle in the sub-scanning direction. Recording of dots is thus prohibited on these raster lines drawn by the broken lines. On the contrary, both the raster lines above and below a raster line that is drawn by the solid line extending in the main scanning direction are recordable with dots. The range in which all dots can be recorded is hereinafter referred to as the "effective record area" (or the "effective print area"). The range in which the nozzles scan but all the dots cannot be recorded are referred to as the "non-effective record area (or the "non-effective print area)". All the area which is scanned with the nozzles (including both the effective record area and the non-effective record area) is referred to as the nozzle scan area.

Various parameters related to the dot recording scheme are shown in FIG. 6(B). The parameters of the dot recording scheme include the nozzle pitch k [dots], the number of used nozzles N, the number of scan repeats s, number of effective nozzles Neff, and the sub-scan feed amount L [dots].

In the example of FIGS. 6(A) and 6(B), the nozzle pitch k is 3 dots, and the number of used nozzles N is 4. The number of used nozzles N denotes the number of nozzles actually used among the plurality of nozzles provided. The number of scan repeats s indicates that dots are formed intermittently once every s dots on a raster line during a single main scan. The number of scan repeats s is accordingly equal to the number of nozzles used to record all dots of each raster line. In the case of FIGS. 6(A) and 6(B), the number of scan repeats s is 1. The number of effective nozzles Neff is obtained by dividing the number of used nozzles N by the number of scan repeats s. The number of effective nozzles Neff may be regarded as the net number of raster lines that can be fully recorded during a single main scan. The meaning of the number of effective nozzles Neff will be further discussed later.

The table of FIG. 6(B) shows the sub-scan feed amount L, its accumulated value $\Sigma L$, and a nozzle offset F after each sub-scan feed. The offset F is a value indicating the distance in number of dots between the nozzle positions and reference positions of offset 0. The reference positions are presumed to be those periodic positions which include the initial positions of the nozzles where no sub-scan feed has been conducted (every fourth dot in FIG. 6(A)). For example, as shown in FIG. 6(A), a first sub-scan feed moves the nozzles in the sub-scanning direction by the sub-scan feed amount L (4 dots). The nozzle pitch k is 3 dots as mentioned above. The offset F of the nozzles after the first sub-scan feed is accordingly 1 (see FIG. 6(A)). Similarly, the position of the nozzles after the second sub-scan feed is $\Sigma L(=8)$ dots away from the initial position so that the offset F is 2. The position of the nozzles after the third sub-scan feed is $\Sigma L(=12)$ dots away from the initial position so that the offset F is 0. Since the third sub-scan feed brings the nozzle offset F back to zero, all dots of the raster lines within the effective record area can be serviced by repeating the cycle of 3 sub-scans.

As will be understood from the above example, when the nozzle position is apart from the initial position by an integral multiple of the nozzle pitch k, the offset F is zero. The offset F is given by $(\Sigma L)\%k$, where $\Sigma L$ is the accumulated value of the sub-scan feed amount L, k is the nozzle pitch, and "%" is an operator indicating that the remainder of the division is taken. Viewing the initial position of the nozzles as being periodic, the offset F can be viewed as an amount of phase shift from the initial position.

When the number of scan repeats s is one, the following conditions are required to avoid skipping or overwriting of raster lines in the effective record area:

Condition c1: The number of sub-scan feeds in one feed cycle is equal to the nozzle pitch k.

Condition c2: The nozzle offsets F after the respective sub-scan feeds in one feed cycle assume different values in the range of 0 to (k–1).

Condition c3: Average sub-scan feed amount $(\Sigma L/k)$ is equal to the number of used nozzles N. In other words, the accumulated value $\Sigma L$ of the sub-scan feed amount L for the whole feed cycle is equal to a product $(N \times k)$ of the number of used nozzles N and the nozzle pitch k.

The above conditions can be understood as follows. Since (k–1) raster lines are present between adjoining nozzles, the number of sub-scan feeds required in one feed cycle is equal to k so that the (k–1) raster lines are serviced during one feed cycle and that the nozzle position returns to the reference position (the position of the offset F equal to zero) after one feed cycle. If the number of sub-scan feeds in one feed cycle is less than k, some raster lines will be skipped. If the number of sub-scan feeds in one feed cycle is greater than k, on the other hand, some raster lines will be overwritten. The first condition c1 is accordingly required.

If the number of sub-scan feeds in one feed cycle is equal to k, there will be no skipping or overwriting of raster lines to be recorded only when the nozzle offsets F after the respective sub-scan feeds in one feed cycle take different values in the range of 0 to (k–1). The second condition c2 is accordingly required.

When the first and the second conditions c1 and c2 are satisfied, each of the N nozzles records k raster lines in one feed cycle. Namely $N \times k$ raster lines can be recorded in one feed cycle. When the third condition c3 is satisfied, the nozzle position after one feed cycle (that is, after the k sub-scan feeds) is away from the initial position by the $N \times k$ raster lines as shown in FIG. 6(A). Satisfying the above first through the third conditions c1 to c3 thus prevents skipping or overwriting of raster lines to be recorded in the range of $N \times k$ raster lines.

FIGS. 7(A) and 7(B) show the basic conditions of a general dot recording scheme when the number of scan repeats s is no less than 2. When the number of scan repeats s is 2 or greater, each raster line is recorded with s different nozzles. In the description hereinafter, the dot recording scheme adopted when the number of scan repeats s is not less than 2 is referred to as the "overlap scheme".

The dot recording scheme shown in FIGS. 7(A) and 7(B) amounts to that obtained by changing the number of scan repeats s and the sub-scan feed amount L among the dot recording scheme parameters shown in FIG. 6(B). As will be understood from FIG. 7(A), the sub-scan feed amount L in the dot recording scheme of FIGS. 7(A) and 7(B) is a constant value of two dots. In FIG. 7(A), the nozzle positions after the odd-numbered sub-scan feeds are indicated by the diamonds. As shown on the right-hand side of FIG. 7(A), the dot positions recorded after the odd-numbered sub-scan feed are shifted by one dot in the main scanning direction from the dot positions recorded after the even numbered sub-scan feed. This means that the plurality of dots on each raster line are recorded intermittently by each of two different nozzles. For example, the upper-most raster in the effective record area is intermittently recorded on every other dot by the No. 2 nozzle after the first sub-scan feed and then intermittently recorded on every other dot by the No. 0 nozzle after the fourth sub-scan feed. In the overlap scheme, each nozzle is generally driven at an intermittent timing so that recording is prohibited for (s−1) dots after recording of one dot during a single main scan.

In the overlap scheme, the multiple nozzles used for recording the same raster line are required to record different positions shifted from one another in the main scanning direction. The actual shift of recording positions in the main scanning direction is thus not restricted to the example shown in FIG. 7(A). In one possible scheme, dot recording is executed at the positions indicated by the circles shown in the right-hand side of FIG. 7(A) after the first sub-scan feed, and is executed at the shifted positions indicated by the diamonds after the fourth sub-scan feed.

The lower-most row of the table of FIG. 7(B) shows the values of the offset F after each sub-scan feed in one feed cycle. One feed cycle includes six sub-scan feeds. The offsets F after each of the six sub-scan feeds assume every value between 0 and 2, twice. The variation in the offset F after the first through the third sub-scan feeds is identical with that after the fourth through the sixth sub-scan feeds. As shown on the left-hand side of FIG. 7(A), the six sub-scan feeds included in one feed cycle can be divided into two sets of sub-cycles, each including three sub-scan feeds. One feed cycle of the sub-scan feeds is completed by repeating the sub-cycles s times.

When the number of scan repeats s is an integer of not less than 2, the first through the third conditions c1 to c3 discussed above are rewritten into the following conditions c1'–c3':

Condition c1': The number of sub-scan feeds in one feed cycle is equal to a product (k×s) of the nozzle pitch k and the number of scan repeats s.

Condition c2': The nozzle offsets F after the respective sub-scan feeds in one feed cycle assume every value between 0 to (k−1), s times.

Condition c3': Average sub-scan feed amount {ΣL/(k×s)} is equal to the number of effective nozzles Neff (=N/s). In other words, the accumulated value ΣL of the sub-scan feed amount L for the whole feed cycle is equal to a product {Neff×(k×s)} of the number of effective nozzles Neff and the number of sub-scan feeds (k×s).

The above conditions c1'–c3' hold even when the number of scan repeats s is one. This means that the conditions c1'–c3' generally hold for the dot recording scheme irrespective of the number of scan repeats s. When these three conditions c1'–c3' are satisfied, there is no skipping or overwriting of dots recorded in the effective record area. If the overlap scheme is applied (if the number of scan repeats s is not less than 2), the recording positions on the same raster should be shifted from each other in the main scanning direction.

Partial overlapping may be applied for some recording schemes. In the "partial overlap" scheme, some raster lines are recorded by one nozzle and other raster lines are recorded by multiple nozzles. The number of effective nozzles Neff can be also defined in the partial overlap scheme. By way of example, if two nozzles among four used nozzles cooperatively record one identical raster line and each of the other two nozzles records one raster line, the number of effective nozzles Neff is 3. The three conditions c1'–c3' discussed above also hold for the partial overlap scheme.

It may be considered that the number of effective nozzles Neff indicates the net number of raster lines recordable in a single main scan. For example, when the number of scan repeats s is 2, N raster lines can be recorded by two main scans where N is the number of actually-used nozzles. The net number of raster lines recordable in a single main scan is accordingly equal to N/S (that is, Neft. The number of effective nozzles Neff in this embodiment corresponds to the number of effective dot forming elements in the present invention.

C. Embodiments of Dot Recording Schemes

Figure 8:
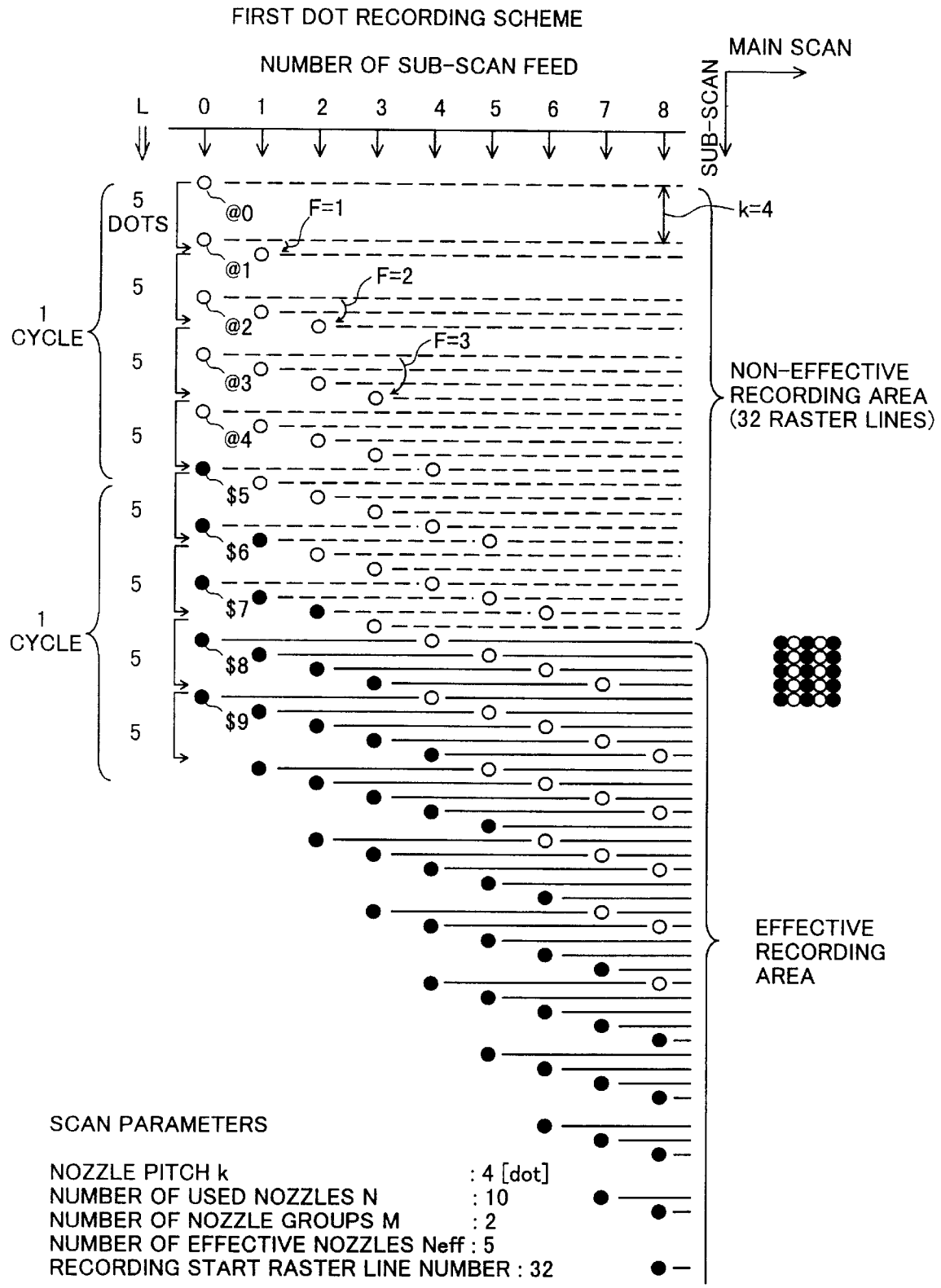
FIG. 8 shows a dot recording scheme in a first embodiment according to the present invention.

FIG. 8 shows a dot recording scheme in a first embodiment according to the present invention. The scan parameters of this dot recording scheme are shown at the bottom of FIG. 8, where the nozzle pitch k is equal to 4 dots, the number of used nozzles N is equal to 10, the number of nozzle groups M is equal to 2, and the number of effective nozzles Neff is equal to 5. The number of nozzle groups M is a new parameter representing the number of classification of the used nozzles. Pixels on each raster line are recorded by M passes of the main scan, which is identical with the number of nozzle groups M; therefore the number of nozzle groups M is equal to the number of scan repeats s.

A recording start raster number is 32 in the example of FIG. 8. The recording start raster number denotes a raster number of a first raster line in an effective recording area when a raster number '0' is of a first raster line in a non-effective recording area. In the dot recording scheme of the first embodiment, the non-effective recording area includes 32 raster lines, and the effective recording area starts from the 33rd raster line.

In the first embodiment of FIG. 8, nozzle numbers @0–@4 and $5–$9 are sequentially of the ten used nozzles. The nozzles having the symbol @ before the numerals record the pixels which have the even pixel addresses on each raster line, whereas the nozzles having the symbol $ before the numerals record the pixels which have the odd pixel addresses on each raster line. In the description hereinafter, the pixels having the even pixel addresses are referred to as the even pixels, and the pixels having the odd pixel addresses are referred to as odd pixels. In the dot recording scheme of the first embodiment, the ten used nozzles are divided into two nozzle groups that are aligned in the sub-scanning direction.

In the dot recording scheme of the first embodiment, one cycle has four sub-scan feeds where the sub-scan feed amounts L are 5, 5, 5, and 5 dots. The number of scan repeats s (which is identical with the number of nozzle groups M)

is equal to 2 in the dot recording scheme of the first embodiment. The meaning of the number of scan repeats s is a little different from that in the overlap scheme shown in FIGS. 7(A) and 7(B). In the first embodiment of FIG. 8, the sub-scan feed is carried out so that the five nozzles in the first nozzle group and those in the second nozzle group respectively satisfy the three conditions c1–c3 while the number of scan repeats s is equal to 1. The number of sub-scan feeds included in one cycle is accordingly equal to 4 (identical with the nozzle pitch k) based on the condition c1. Since the number of scan repeats s can have a little different meaning from that in the conventional overlap scheme in the embodiments of the present invention, the number of nozzle groups M is used for the scanning parameter instead of the number of scan repeats s. The principle of the sub-scan feed will be described in detail later.

As described before, the effective recording area of the first embodiment starts at the 33rd raster line from the upper end of the nozzle scan range. Since the nozzle position in the first pass of the main scan is set apart by a fixed distance from the upper end of the printing paper, the earlier starting position of the effective recording area will enable to record dots from the closer position to the upper end of the printing paper.

FIGS. 9(A) and 9(B) show the scanning parameters and the raster numbers of the effective raster lines recorded by the respective nozzles in the dot recording scheme of the first embodiment. The first table in FIG. 9(A) shows the type of pixel position recorded by the respective nozzles. The pixel position 'even'represents even pixels and 'odd'represents odd pixels. The second table in FIG. 9(A) shows the sub-scan feed amount L, its summation ΣL, and the nozzle offset F after each sub-scan feed.

Each of the first nozzle group @0–@4 and the second nozzle group $5–$9 includes five nozzles. The nozzle pitch within each nozzle group (hereinafter referred to as the effective nozzle pitch keff) is equal to 4 dots. The value of the offset F is a remainder obtained by dividing the summation ΣL of the sub-scan feed amounts L by the effective nozzle pitch keff. The number of nozzles included in each of the first nozzle group and the second nozzle group is equal to the number of effective nozzles Neff (=5), and the effective nozzle pitch in each group is equal to 4 dots. In other words, each of the two nozzle groups includes Neff nozzles arranged regularly at the same effective nozzle pitch keff.

Since the first and second nozzle groups record different pixel positions, the sub-scan feeds are carried out so that each nozzle group is to execute dot recording on all the raster lines in the effective recording area. When a plurality of used nozzles are classified into a plurality of nozzle groups and each nozzle group execute dot recording on all the raster lines in the effective recording area, the sub-scan feed is determined so that each nozzle group satisfies the following conditions c1"–c3":

Condition c1": The number of sub-scan feeds included in one cycle is identical with the effective nozzle pitch keff.

Condition c2": The offset {(ΣL)%keff} of the nozzle after each sub-scan feed in one cycle is the value in the range of 0 to (keff-1).

Condition c3": The average sub-scan feed amount (ΣL/keff) is equal to the number of effective nozzles Neff. In other words, the summation ΣL of the sub-scan feed amounts L per one cycle is equal to the product (Neff×keff) of the number of effective nozzles Neff and the number of sub-scan feeds keff.

These conditions c1"–c3" are practically equivalent to the three conditions c1–c3 discussed above. Namely it may be thought that each nozzle group satisfies the three conditions c1–c3.

The parameters shown in FIG. 9(A) satisfy the three conditions c1"–c3". The number of sub-scan feeds included in one cycle is equal to the effective nozzle pitch keff (=4) (first condition c1"). The offset F of the nozzle after each sub-scan feed in one cycle is the value in the range of 0 to (keff-1), that is, in the range of 0 to 3, (second condition c2"). The average sub-scan feed amount (ΣL/keff) is equal to the number of effective nozzles Neff (=5) (third condition c3"). The dot recording scheme of the first embodiment thus fulfills the basic requirement, that is, no skipping or overwriting of raster lines in the effective recording area. The scanning parameters in other embodiments discussed later are also determined to satisfy these three conditions c1"–c3".

The dot recording scheme of the first embodiment has a first feature that the nozzles @0–@4 in the first nozzle group execute dot recording on even pixels on each raster line and that the nozzles $5–$9 in the second nozzle group execute dot recording on odd pixels on the each raster line. In the overlap scheme of FIGS. 7(A) and 7(B), each nozzle execute dot recording on even pixels in a certain pass of the main scan and on odd pixels in another pass of the main scan. In the dot recording scheme of the first embodiment, on the other hand, each nozzle is preset to execute dot recording on the pixels of a predetermined position type (that is, either the even positions or the odd positions) on each raster line. This is the primary difference from the conventional overlap scheme. The dot recording scheme of the first embodiment further has a second feature that the ten used nozzles are divided into the plurality of nozzle groups aligned in the sub-scanning direction. The advantages of these features will be described later.

FIG. 9(B) shows the effective raster numbers of the effective raster lines recorded by the respective nozzles in the main scan pass after each sub-scan feed. The left end column of FIG. 9(B) shows the nozzle numbers @1–@4 and $5–$9. The numerals in the table represent which raster lines in the effective recording area are recorded by these nozzles after the 0th to the 15th sub-scan feeds. By way of example, in the main scan pass after the 0th sub-scan feed, the nozzles $8 and $9 respectively record the odd pixels on the 0th and 4th effective raster lines. In the main scan pass after the 1st sub-scan feed, the nozzles $7–$9 record the odd pixels on the 1st, the 5th, and the 9th effective raster lines. The effective raster lines here denote the raster lines in the effective recording area. In the table of FIG. 9(B), the effective raster numbers with a prime indicate that the odd pixels on the raster line are to be recorded. The effective raster numbers without a prime, on the other hand, indicate that the even pixels on the raster line are to be recorded.

One cycle includes keff passes of the main scan with the Neff nozzles and thereby records Neff×keff raster lines, that is, 20 raster line. As clearly understood from FIG. 8, however, twenty consecutive raster lines are not recorded by the consecutive main scan passes in one cycle. The table of FIG. 9(B) clearly shows which nozzle records each pixel position on the first twenty raster lines in the effective recording area. For example, the odd pixels on the raster line of the raster number 0 (that is, the first raster line in the effective recording area) are recorded with the nozzle $8 in the first pass of the main scan. The even pixels on the raster line 0 are, on the other hand, recorded with the nozzle @3 in the main scan pass after the four sub-scan feeds.

The stepwise line in the table of FIG. 9(B) shows the boundary of the twenty consecutive raster lines. Raster lines are equivalent to each other when their difference in effective raster number is equal to 20. By way of example, the raster line of the effective raster number 3 recorded at first by the nozzle @0 is equivalent to the raster lines of the effective raster numbers 23 and 43 in terms of the scanning conditions.

FIG. 10 shows the nozzle numbers of the nozzles that execute dot recording on the effective raster lines in the dot recording scheme of the first embodiment. The numerals 0–28 in the left end column of FIG. 10 show the effective raster numbers. The nozzle numbers in the right half of FIG. 10 represent the positions of the effective raster lines recorded by the ten nozzles @0–@4 and $5–$9 in the main scan passes after the respective sub-scan feeds. For example, in the main scan pass after the 0th sub-scan feed, the nozzles $8 and $9 execute dot recording on the 0th and 4th effective raster lines. Comparison between FIG. 10 and FIG. 9(B) further clarifies the relationship between the effective raster lines and the nozzle numbers.

The second left columns of FIG. 10 shows after which sub-scan feed the even pixels and the odd pixels on each raster line are recorded. For example, the even pixels on the raster line 0 are recorded in the main scan pass after the fourth sub-scan feeds, whereas the odd pixels on the raster line 0 are recorded in the first main scan pass. The numeral in the parentheses of these columns shows the value obtained by subtracting the number of sub-scan feeds at the recording of the specific raster line from the number of sub-scan feeds at the recording of the above next raster line. The numeral in the parentheses is hereinafter referred to as the "sub-scan feed number difference." For example, the even pixels on the raster line 0 are recorded after the fourth sub-scan feeds, whereas the even pixels on the raster line 1 are recorded after the five sub-scan feeds. The sub-scan feed number difference is equal to 1 for the even pixels on the raster line 1. In a similar manner, the even pixels on the raster line 3 are recorded after the seven sub-scan feeds, whereas the even pixels on the raster line 4 are recorded after the four sub-scan feeds. The sub-scan feed number difference is equal to −3 for the even pixels on the raster line 3.

The greater absolute value of the sub-scan feed number difference indicates the greater difference of time between recording of vertically aligned two pixels and the greater difference in the sheet feed amount in the sub-scanning direction. In the first embodiment, the maximum absolute value of the sub-scan feed number difference is equal to 3 for both the even pixels and the odd pixels.

It is ideal that the sub-scan feed is carried out strictly by the amount equal to an integral multiple of the dot pitch. Actually, however, there is some feeding errors. The sub-scan feed error is accumulated on every sub-scan feed. In the case where a large number of sub-scan feeds are interposed between recording of adjoining raster lines, the positional misalignment may occur between the adjoining raster lines due to the accumulated sub-scan feed error. The smaller sub-scan feed number difference shown by the numeral in the parentheses in FIG. 10 is favorable, in order to reduce the positional misalignment between the adjoining raster lines due to the accumulated sub-scan feed error. In the dot recording scheme of the first embodiment shown in FIG. 10, the sub-scan feed number difference is not greater than 3. This is significantly smaller than the values in other embodiments and control examples discussed later, so that the dot recording scheme of the first embodiment is a favorable one in this respect.

The small sub-scan feed number difference in the first embodiment is ascribed to the arrangement of the ten nozzles, in which the nozzles in each nozzle group are collectively arranged. The sub-scan feed is carried out so that each nozzle group executes dot recording on specific pixels on all the raster lines in the course of the repeated cycle, and one cycle includes keff (=4) sub-scan feeds. The sub-scan feed number difference is accordingly not greater than the effective nozzle pitch keff in each nozzle group. In the arrangement of the first embodiment, the effective nozzle pitch keff is 4 dots in each nozzle group, and this value is the minimum possible value (that is, the nozzle pitch of the actually mounted nozzles) and is smaller than the effective nozzle pitch in other embodiments discussed later. In the first embodiment, the ten nozzles are separated at the middle of the nozzle array into two groups in such a manner that the nozzles in each nozzle group are collectively arranged. This is the reason why the effective nozzle pitch keff in each nozzle group is the minimum possible value. This arrangement advantageously reduces the sub-scan feed number difference and thereby the accumulated sub-scan feed error.

Four different symbols ".", "×", "↑", and "↓" in the third-left column of FIG. 10 show whether or not the adjoining raster lines have already been recorded before the recording of each raster line. The respective symbols have the following meaning:

↑: Only the next below raster line has already been recorded.

↓: Only the next above raster line has already been recorded.

×: Both the next below and above raster lines have already been recorded.

·: Neither of the next raster lines have been recorded.

The suffix * after these symbols indicates that both of the even and odd pixels on the raster line are assigned with the same symbol.

The presence or absence of recorded pixels just above and below a certain pixel to be recorded affects the quality of the raster line including the certain pixel. The effect on the quality is ascribed to the dryness of ink of the adjoining recorded pixels and the sub-scan feed error. The appearance of the pattern of the above four symbols at a relatively large period may deteriorate the image quality of the whole image. In the dot recording scheme of the first embodiment shown in FIG. 10, the pattern of the four symbols has a relatively small period of 4 dots. For example, when the dot resolution is equal to 300 dpi, this period is about 0.3 mm and relatively inconspicuous. Since the first embodiment executes dot recording at this relatively small period, there is a low possibility that the accumulated sub-scan feed error at this small period is observed as the deterioration of the image quality.

FIGS. 11(A) and 11(B) show the scanning parameters and the raster numbers of the effective raster lines recorded by the respective nozzles in the dot recording scheme of a first control example. The fundamental scanning parameters (the nozzle pitch k, the number of used nozzles N, the number of scan repeats s, and the number of effective nozzles Neff) in the dot recording scheme of the first control example are identical with those in the first embodiment (see FIGS. 9(A) and 9(B)). Each nozzle executes dot recording on an even pixel or an odd pixel in each pass of the main scan. The bottom row in the tables of FIGS. 11(A) and the table of FIG. 11(B) show which of the even pixel and the odd pixel is recorded by each nozzle after each sub-scan feed. In the main scan pass after the 1st sub-scan feed, for example, all the nozzles execute dot recording on odd pixels. The first control example accordingly adopts the conventional overlap scheme as discussed above with the drawing of FIGS. 7(A) and 7(B).

FIG. 12 shows the nozzle numbers of the nozzles that execute dot recording on the effective raster lines in the dot recording scheme of the first control example. The maximum absolute value of the sub-scan feed number difference (the numeral in the parentheses) shown in the second left column is equal to 7, and it is greater than 3, which is given as the maximum absolute value of the sub-scan feed number difference in the first embodiment (see FIG. 10). This means that the accumulated error of the sub-scan feed is smaller in the arrangement of the first embodiment than in the first control example.

FIGS. 13(A) and 13(B) show the scanning parameters and the raster numbers of the effective raster lines recorded by the respective nozzles in the dot recording scheme of a second control example. The fundamental scanning parameters (the nozzle pitch k, the number of used nozzles N, the number of scan repeats s, and the number of effective nozzles Neff) in the dot recording scheme of the second control example are identical with those in the first embodiment (see FIGS. 9(A) and 9(B)) and in the first control example (see FIGS. 11(A) and 11(B)). As shown in the bottom row of the table of FIG. 13(A) and the table of FIG. 13(B), the difference from the first control example is that all the nozzles execute dot recording on even pixels in the first four passes of the main scan and on odd pixels in the next four passes of the main scan in the second control example.

FIG. 14 shows the nozzle numbers of the nozzles that execute dot recording on the effective raster lines in the dot recording scheme of the second control example. The maximum absolute value of the sub-scan feed number difference (the numeral in the parentheses) shown in the second left column is equal to 7, and it is greater than 3, which is given as the maximum absolute value of the sub-scan feed number difference in the first embodiment (see FIG. 10). This means that the accumulated error of the sub-scan feed is smaller in the arrangement of the first embodiment than in the second control example.

By comparing the adjoining relationship (the third left column) in the first control example of FIG. 12 with that in the second control example of FIG. 14, it can be understood that the raster lines with the suffix *, which have the same adjoining relationship for the even pixels and the odd pixels, appear at a larger period (that is, at a lower frequency) in the second control example. The occurrence of the regular pattern at a relatively large period may be observed with naked eyes as the deterioration of the image quality. Namely the arrangement of the first control example is better than that of the second control example.

As discussed above, since the ten nozzles are divided at the middle of the nozzle array into two groups in the dot recording scheme of the first embodiment, the effective nozzle pitch keff within each nozzle group is set at the minimum possible value that is equal to the pitch k of all the nozzles. This arrangement effectively reduces the accumulated sub-scan feed error.

Figure 15:
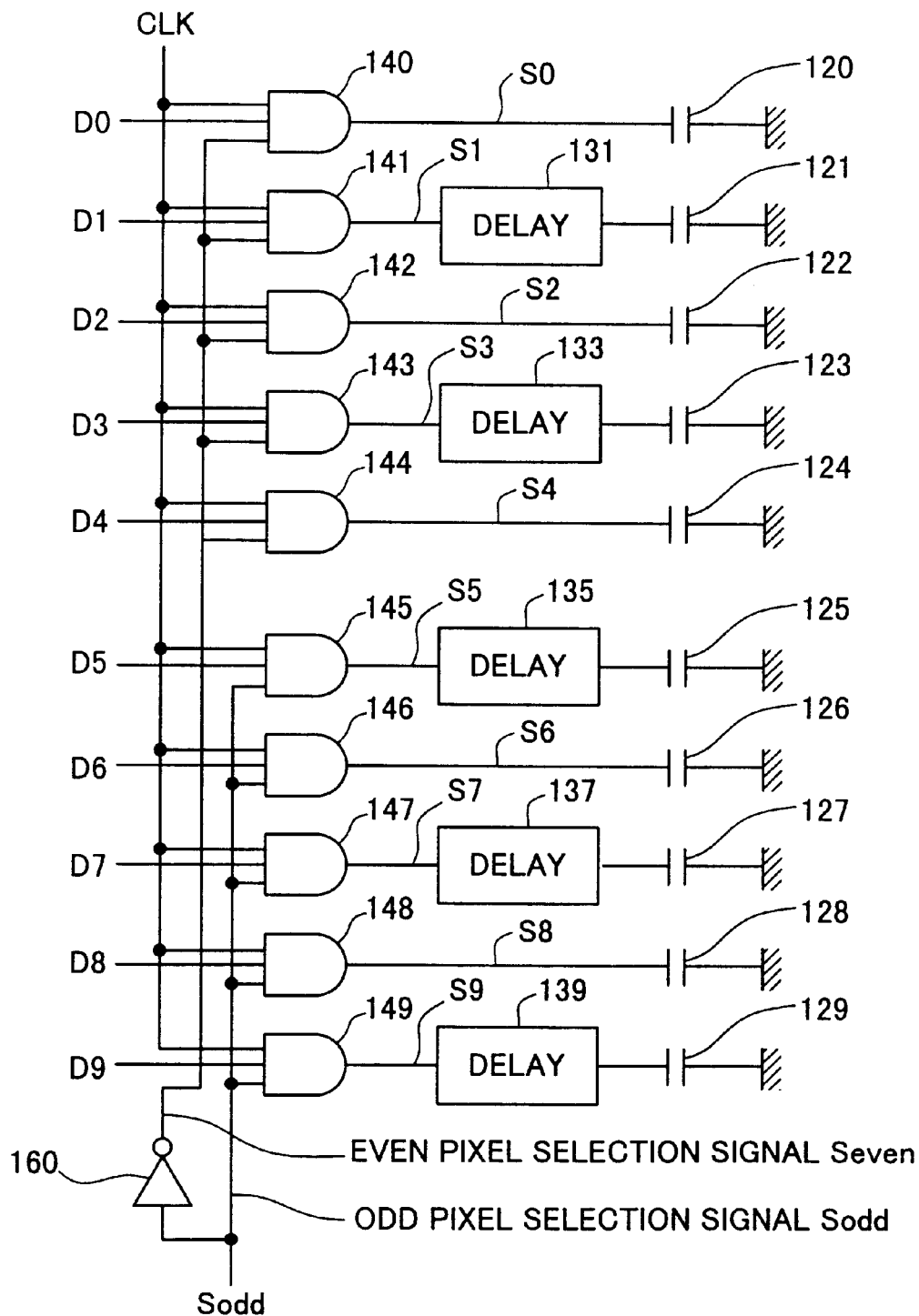
FIG. 15 is an equivalent circuit diagram showing a driving circuit that regulates the record timings of the respective nozzles in the two nozzle groups in the dot recording scheme of the first embodiment.

FIG. 15 is an equivalent circuit diagram showing a driving circuit that regulates the record timings of the respective nozzles in the two nozzle groups in the dot recording scheme of the first embodiment. The driving circuit includes actuators 120–129(corresponding to the piezoelectric elements PE in FIG. 4) for the ten nozzles, five delay circuits 131, 133, 135, 137, and 139 disposed before the alternate five actuators 121, 123, 125, 127, and 129, 3-input AND gates 140–149 related to the respective nozzles, and one inverter 160. The circuit elements of FIG. 15 except the actuators 120–129 are included in the control circuit 40 (FIG. 2). Since the nozzle actuators 120–129 in the ink jet printer of the embodiment are piezoelectric elements, they are represented by capacitors in this equivalent circuit. In the bubble jet printer, the actuators 120–129 will be represented by resistant exothermic elements.

The ten AND gates 140–149 receive dot pattern data D0–D9 representing the on-off state of each dot for the respective nozzles. The dot pattern data D0–D9 of the respective nozzles generally represent different patterns of on-off states according to the contents of the image on the respective raster lines. As a matter of convenience, in the description below, it is assumed that all the dot pattern data D0–D9 represent the same on-off pattern.

An even pixel selection signal Seven is commonly input into the five AND gates 140–144 related to the nozzles for recording the even pixels. An odd pixel selection signal Sodd is commonly input into the five AND gates 145–149 related to the nozzles for recording the odd pixels. The odd pixel selection signal Sodd is generated in another circuit included in the control circuit 40 and supplied to the driving circuit shown in FIG. 15. The odd pixel selection signal Sodd is inverted to make the even pixel selection signal Seven by the inverter 160. A nozzle driving clock signal CLK is commonly input into the ten AND gates 140–149.

FIGS. 16(a)–16(h) are timing charts showing the operations of the circuit of FIG. 15. FIG. 16(a) shows the dot pattern data D0–D9 supplied from the halftone module 99 (see FIG. 1) of the computer 90. As mentioned previously, it is assumed in this embodiment that the same dot pattern data is input into Seven and FIG. 16(c) shows the nozzle driving clock signal CLK. The five AND gates 140–144 selectively output the nozzle driving signals that have a pattern corresponding to the level of the even pixel positions of the dot pattern data D0–D9 at a timing when the nozzle driving clock signal CLK assumes the High level. FIG. 16(d) shows even pixel nozzle driving signals S0–S4 output from the AND gates 140–144.

The five delay circuits 131, 133, 135, 137, and 139 of FIG. 15 aligns the dots recorded by the nozzles 101, 103, . . . in the following column with the dots recorded by the nozzles 100, 102, . . . in the preceding column of the nozzle array, in which the nozzles are arranged in zigzag. The amount of delay in these delay circuits is regulated according to the main scan speed.

FIGS. 16(e)–16(h) show input signals into the other five AND gates 145–149 and odd pixel nozzle driving signals S5–S9 output from these AND gates. The five AND gates 145–149 selectively output the nozzle driving signals that have a pattern corresponding to the level of the odd pixel positions of the dot pattern data D0–D9 at the timing when the nozzle driving clock signal CLK assumes the High level.

This structure inputs the dot pattern data including the on-off pattern of the pixel positions for both the even pixels and the odd pixels into the respective AND gates 140–149. In one possible modification, dot pattern data including only the on-off pattern of the even pixels may be input into the AND gates 140–144 related to the even pixels, and another dot pattern data including only the on-off pattern of the odd pixels may be input into the AND gates 145–149 related to the odd pixels. In this modified structure, the dot pattern data shown in FIG. 16(a) is divided into the dot pattern data for the even pixels and that for the odd pixels. In this case, the frequency of the dot pattern data for even pixels and that for the odd pixels may be halved (that is, the period may be doubled). Such division in the printer driver 96 halves the frequency of the output dot pattern data and thereby enhances the processing speed. The advantage of the driving method shown in FIGS. 15 and 16(a)–(h), on the other hand, is that the division of the dot pattern data is not required.

FIGS. 17(A) and 17(B) show the scanning parameters and the raster numbers of the effective raster lines recorded by the respective nozzles in the dot recording scheme of a second embodiment according to the present invention. The fundamental scanning parameters except the effective nozzle pitch keff (that is, the nozzle pitch k, the number of used nozzles N, the number of nozzle groups M, and the number of effective nozzles Neff) in the dot recording scheme of the second embodiment are identical with those in the first embodiment (see FIGS. 9(A) and 9(B)). As shown in the first table of FIG. 17(A) and the table of FIG. 17(B), the ten used nozzles are classified alternately into two nozzle groups. In the first nozzle group of five nozzles @0,@2, @4, @6, and @8, the effective nozzle pitch keff is equal to 8 dots. In the second nozzle group of five nozzles $1, $3, $5, $7, and $9, the effective nozzle pitch keff is also equal to 8 dots. The second table of FIG. 17(A) shows the sub-scan feed amount L in one cycle and the offset F.

FIG. 18 shows the nozzle numbers of the nozzles that execute dot recording on the effective raster lines in the dot recording scheme of the second embodiment. The maximum absolute value of the sub-scan feed number difference (the numeral in the parentheses) shown in the second left column is equal to 5. This value is greater than 3, which is given as the maximum absolute value of the sub-scan feed number difference in the first embodiment (see FIG. 10), but smaller than 7, which is given as the maximum absolute value of the sub-scan feed number difference in the first and second control examples (see FIGS. 12 and 14). The accumulated sub-scan feed error is accordingly smaller in the second embodiment than in the first control and second control examples. The greater sub-scan feed number difference in the second embodiment than in the first embodiment is ascribed to the greater effective notch pitch keff (=8 dots) in the second embodiment than the effective nozzle pitch keff (=4 dots) in the first embodiment. The nozzle classification effecting the smaller effective nozzle pitch keff is desired in order to reduce the accumulated sub-scan feed error,.

The advantage of the greater effective nozzle pitch keff is, on the other hand, that it enhances the degree of freedom in selecting scanning parameters to satisfy the conditions c1"–c3" discussed previously. Appropriate selection of the scanning parameters while utilizing this advantage can construct a dot recording scheme that gives higher image quality. From that point of view, the greater effective nozzle pitch keff is preferable. The nozzle classification that sets the effective nozzle pitch keff equal to 8 dots is especially preferable since there is a higher possibility of attaining a dot recording scheme with keff=8 that gives high image quality The adjoining relationship (representing the presence or absence of recorded pixels above and below a certain pixel to be recorded) in the third left column of the table shown in FIG. 18 has a regular short period of about 5 pixels. This period is significantly smaller than those in the first control example (FIG. 12) and the second control example (FIG. 14). There is accordingly little fear of the appearance of unevenness in the resulting recorded image. The same symbol, such as '·' or '×', does not continue in the sub-scanning direction, and a variation in the symbols has a high frequency. This effectively prevents the appearance of the unevenness of the resulting image in the sub-scanning direction. The pattern of the symbols for the even pixels does not coincide with the pattern of the symbols for the odd pixels. This arrangement disperses the periodic characteristics in the even pixels and the odd pixels and thereby prevents the appearance of the unevenness of the resulting image in the sub-scanning direction.

FIGS. 19(A) and 19(B) show the scanning parameters and the raster numbers of the effective raster lines recorded by the respective nozzles in the dot recording scheme of a third embodiment according to the present invention. In the third embodiment, the nozzle pitch k is 4 dots, the number of used nozzles N is 14, the number of nozzle groups M is 2, and the number of effective nozzles Neff is 7. As shown in the first table of FIG. 19(A), the fourteen nozzles are alternately classified into two nozzle groups. In the first nozzle group including nozzles @0, @2, . . . , @12, the effective nozzle pitch keff is equal to 8 dots. In the second nozzle group including nozzles $1, $3, . . . , $13, the effective nozzle pitch keff is also equal to 8 dots. One cycle accordingly includes eight sub-scan feeds, whose number is equal to the effective nozzle pitch keff.

The third embodiment has a feature that the sub-scan feed amount L is not fixed but has two different values of 5 dots and 13 dots as shown in the second table of FIG. 19(A). This feature has the advantage as follows. As described previously in the prior art, integers that are prime to each other are set to the number of nozzles N and the nozzle pitch k in the prior art dot recording scheme. Even when a large number of nozzles are mounted on the print head, the number of actually used nozzles N is restricted to the value that is prime to the nozzle pitch k in the prior art, and this results in insufficient use of the nozzles mounted on the print head. If this condition is adopted to the embodiment of the present invention, the effective nozzle pitch keff and the number of effective nozzles Neff are restricted to be those prime to each other. This also results in insufficient use of the nozzles mounted on the head. The arrangement of applying a plurality of different values for the sub-scan feed amount L can satisfy the basic three conditions c1"–c3", even when the effective nozzle pitch keff and the number of effective nozzles Neff are not prime to each other. This arrangement can construct a dot recording scheme that uses the nozzles as many as possible accordingly.

FIG. 20 shows the nozzle numbers of the nozzles that execute dot recording on the effective raster lines in the dot recording scheme of the third embodiment. The maximum absolute value of the sub-scan feed number difference (the numeral in the parentheses) shown in the second left column is equal to 5. This value is identical with that in the second embodiment (see FIG. 18). Like the second embodiment, the accumulated sub-scan feed error is thus smaller in the third embodiment than in the first and second control examples.

The adjoining relationship shown in the third left column of FIG. 20 is practically similar to that of the second embodiment shown in the table of FIG. 18. Like the second embodiment, the arrangement of the third embodiment advantageously prevents the unevenness of the resulting image, compared with the first and second control examples.

FIGS. 21(A) and 21(B) show the scanning parameters and the raster numbers of the effective raster lines recorded by the respective nozzles in the dot recording scheme of a fourth embodiment according to the present invention. In the fourth embodiment, the nozzle pitch k is 4 dots, the number of used nozzles N is 15, the number of nozzle groups M is 3, and the number of effective nozzles Neff is 5. As shown in the first table of FIG. 21(A), the fifteen nozzles are sequentially divided into three nozzle groups. Nozzles @0–@4 in the first nozzle group execute dot recording at the pixel positions where the remainder obtained by dividing the pixel address by 3 is equal to zero; the position is represented by the symbol %3=0 in the first table of FIG. 21(A)). Nozzles $5–$9 in the second nozzle group execute dot recording at the pixel positions where the remainder obtained by dividing the pixel address by 3 is equal to one; the position is represented by the symbol %3=1 in the first table of FIG. 21(A). Nozzles #10–#14 in the third nozzle group execute dot recording at the pixel positions where the remainder obtained by dividing the pixel address by 3 is equal to two; the position is represented by the symbol %3=2 in the table of FIG. 21(A). In the arrangement of the fourth embodiment, three different types of dot positions are related to the three nozzle groups, respectively. In the dot recording scheme of the fourth embodiment, like the first embodiment, a plurality of nozzles are divided into a plurality of nozzle groups which are aligned in the sub-scanning direction.

The effective nozzle pitch keff is equal to 4 dots within each nozzle group of the fourth embodiment. One cycle accordingly includes four sub-scan feeds, whose number is equal to the effective nozzle pitch keff.

FIG. 22 shows the nozzle numbers of the nozzles that execute dot recording on the effective raster lines in the dot recording scheme of the fourth embodiment. The maximum absolute value of the sub-scan feed number difference (the numeral in the parentheses) shown in the second left column is equal to 3. This value is identical with that in the first embodiment (see FIG. 10). Like the first embodiment, the accumulated sub-scan feed error is thus smaller in the fourth embodiment than in the other embodiments and the first and second control examples.

The adjoining relationship shown in the third left column of FIG. 22 is practically similar to that of the first embodiment shown in the table of FIG. 10. Like the first embodiment, the arrangement of the fourth embodiment advantageously prevents the unevenness of the resulting image, compared with the first and second control examples.

FIGS. 23(A) and 23(B) show the scanning parameters and the raster numbers of the effective raster lines recorded by the respective nozzles in the dot recording scheme of a fifth embodiment according to the present invention. In the fifth embodiment, the nozzle pitch k is 4 dots, the number of used nozzles N is 20, the number of nozzle groups M is 4, and the number of effective nozzles Neff is 5. As shown in the first table of FIG. 23(A), the twenty nozzles are classified one by one into four nozzle groups. Nozzles @0, @4 , . . . , @16 in the first nozzle group execute dot recording at the pixel positions where the remainder obtained by dividing the pixel address by 4 is equal to zero; the position is represented by the symbol %4=0 in the first table of FIG. 23(A). Nozzles $1, $5, . . . , $17 in the second nozzle group execute dot recording at the pixel positions where the remainder obtained by dividing the pixel address by 4 is equal to one; the position is represented by the symbol %4=1 in the first table of FIG. 23(A). Nozzles #2, #6, . . . , #18 in the third nozzle group execute dot recording at the pixel positions where the remainder obtained by dividing the pixel address by 4 is equal to two; the position is represented by the symbol %4=2 in the first table of FIG. 23(A). Nozzles &3, &7, . . . , &19 in the fourth nozzle group execute dot recording at the pixel positions where the remainder obtained by dividing the pixel address by 4 is equal to three; the position is represented by the symbol %4=3 in the first table of FIG. 23(A). In the arrangement of the fifth embodiment, four different types of pixel positions are related to the four nozzle groups, respectively. The dot recording scheme of the fifth embodiment similar to those of the second and third embodiments in that a plurality of nozzles arrayed in the sub-scanning direction are classified one by one into a plurality of nozzle groups. The fifth embodiment is closer to the second embodiment from the viewpoint that the sub-scan feed amount L is a constant value.

The effective nozzle pitch keff is equal to 16 dots within each nozzle group of the fifth embodiment. One cycle accordingly includes sixteen sub-scan feeds, whose number is equal to the effective nozzle pitch keff. For convenience of illustration, FIG. 23(A) shows the feed amounts L only for eight sub-scans.

Figure 24:
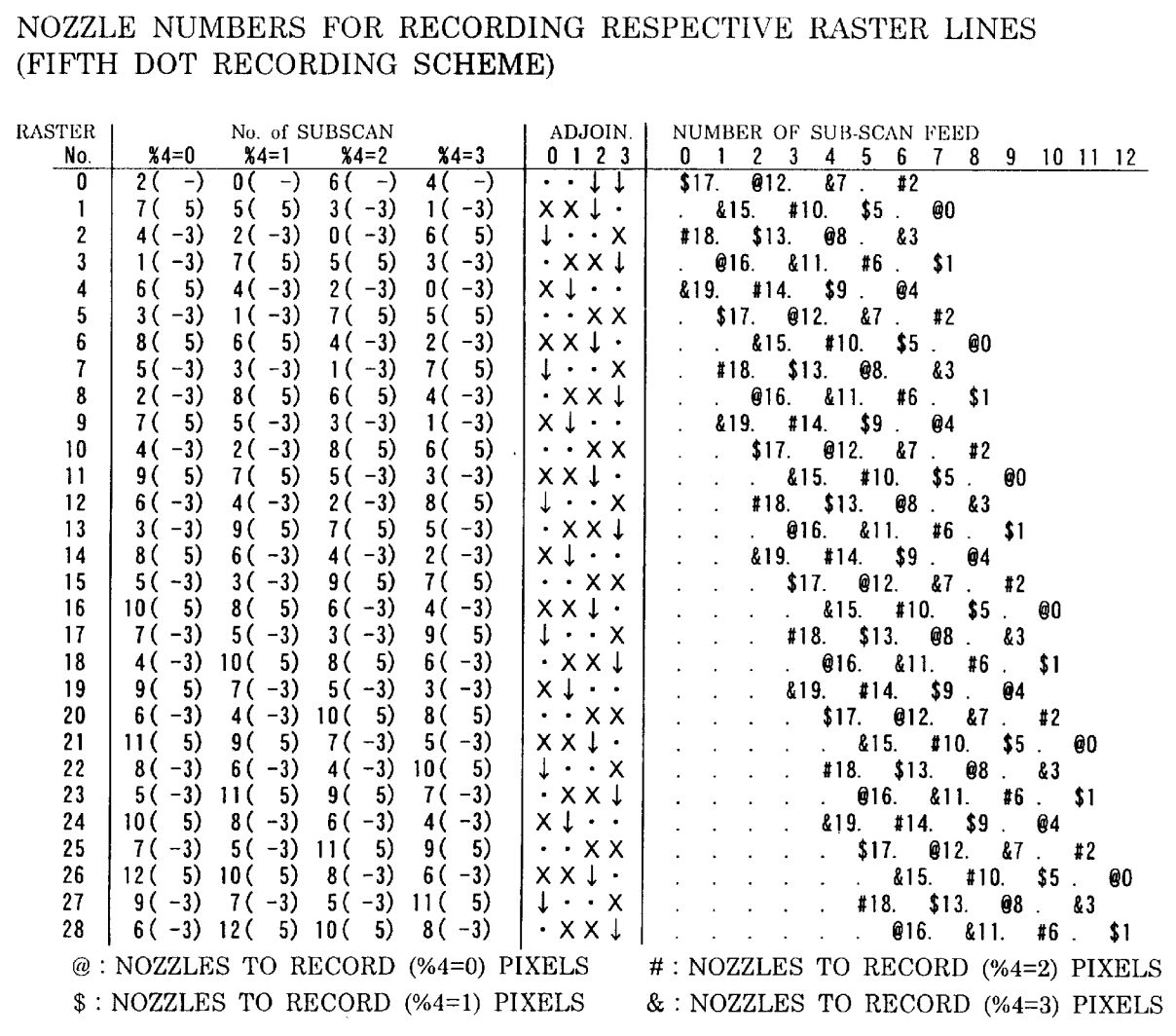

FIG. 24 shows the nozzle numbers of the nozzles that execute dot recording on the effective raster lines in the dot recording scheme of the fifth embodiment. The maximum absolute value of the sub-scan feed number difference (the numeral in the parentheses) shown in the second left column is equal to 5. This value is identical with that in the second embodiment (see FIG. 18). Like the second embodiment, the accumulated sub-scan feed error is thus smaller in the fifth embodiment than in the first and second control examples.

The adjoining relationship shown in the third left column of FIG. 24 is practically similar to that of the second embodiment shown in the table of FIG. 18 and has a regular short period of about 5 pixels. Like the second embodiment, the arrangement of the fifth embodiment advantageously prevents the unevenness of the resulting image in the sub-scanning direction.

FIG. 25 shows the scanning parameters in the dot recording scheme of a sixth embodiment according to the present invention. In the sixth embodiment, the nozzle pitch k is 8 dots, the number of used nozzles N is 10, the number of nozzle groups M is 2, and the number of effective nozzles Neff is 5. As shown in the first table of FIG. 25, the ten nozzles are alternately classified into two nozzle groups. Nozzles @0, @2, . . . @, 8 in the first nozzle group execute dot recording at even pixels, and nozzles $1, $3, . . . , $9 in the nozzle group execute dot recording at odd pixels. The difference from the second embodiment shown in FIG. 17(A) is that the nozzle pitch k is changed to 8 dots in the sixth embodiment.

The effective nozzle pitch keff is equal to 16 dots within each nozzle group of the sixth embodiment. One cycle accordingly includes sixteen sub-scan feeds, whose number is equal to the effective nozzle pitch keff.

FIG. 26 shows the raster numbers of the effective raster lines recorded by the respective nozzles in the sixth embodiment. FIG. 27 shows the nozzle numbers of the nozzles that execute dot recording on the effective raster lines in the dot recording scheme of the sixth embodiment. The maximum absolute value of the sub-scan feed number difference (the numeral in the parentheses) shown in the second left column is equal to 5. This value is identical with that in the second embodiment (see FIG. 18) and in the fifth embodiment (see FIG. 24). Like the second and fifth embodiments, the accumulated sub-scan feed error is thus smaller in the sixth embodiment than in the first and second control examples.

The adjoining relationship (representing the presence or absence of recorded pixels above and below a certain pixel to be recorded) in the third left column of FIG. 27 has a regular short period. This effectively prevents the unevenness of the resulting image in the sub-scanning direction. The recording pattern of the sixth embodiment has the more accurate regularity than the other embodiments. The arrangement of the sixth embodiment may thus attain the finer image recording.

As described above in the above embodiments, various dot recording schemes having different advantages can be constructed by classifying a plurality of used nozzles into a plurality of nozzle groups each including an identical number Neff of nozzles, and by causing each nozzle group to execute dot recording at a different type of pixel position.

D. Various Classification Methods of Nozzles and Dot Positions

A variety of methods other than those described in the above embodiments are applicable to the classification of the nozzles and the classification of dot positions. FIGS. 28(a)–28(d) show a variety of nozzle classification methods. The first classification method shown in FIG. 28(a) divides ten nozzles, which record ten dots aligned at identical pitches in the sub-scanning direction, by one virtual boundary line BR into two nozzle groups separated in the sub-scanning direction. The number of effective nozzles Neff is equal to 5, and the effective nozzle pitch keff is equal to 4 dots. The distance (positional offset) d between the two nozzle groups in the sub-scanning direction is equal to 40 dots. The first classification method is generalized to be the method of dividing a plurality of nozzles, which record a plurality of dots aligned at identical pitches in the sub-scanning direction, by (M-1) boundary lines into M nozzle groups, where M is an integer of not less than 2. The first and fourth embodiments adopt this first classification method. The first classification method minimizes the effective nozzle pitch keff, which results in the small accumulated sub-scan feed error.

Figure 28:
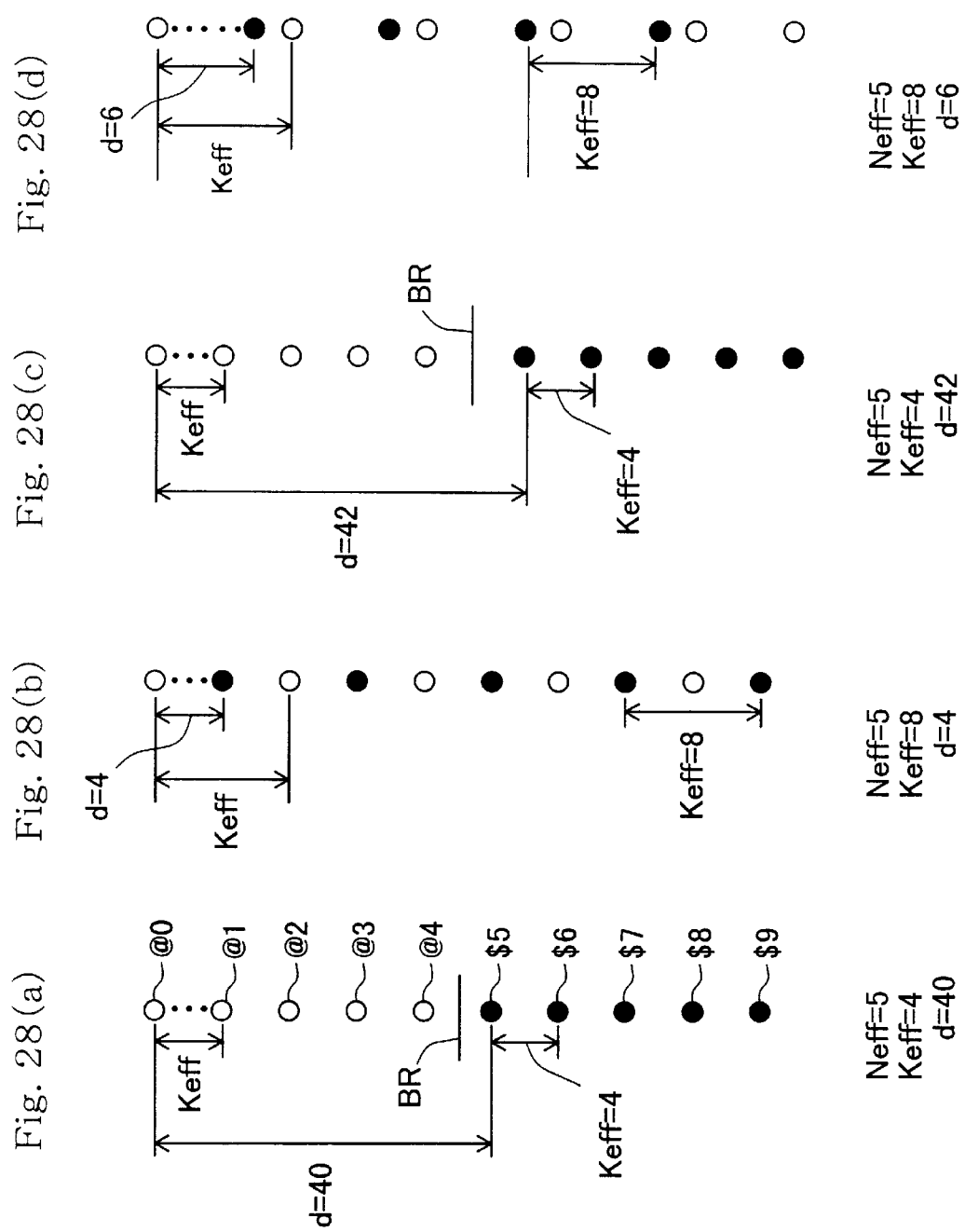
FIGS. 28(a)–28(d) show a variety of nozzle classification methods.

The second classification method shown in FIG. 28(b) alternately classifies the ten nozzles, which record ten dots aligned at identical pitches in the sub-scanning direction, into two nozzle groups. The number of effective nozzles Neff is equal to 5, and the effective nozzle pitch keff is equal to 8 dots. The distance (positional offset) d between the two nozzle groups in the subscanning direction is equal to 4 dots. The second classification method is generalized to be the method of classifying a plurality of nozzles, which record a plurality of dots aligned at identical pitches in the sub-scanning direction, one by one into M nozzle groups, where M is an integer of not less than 2. The second, third, fifth, and sixth embodiments adopt this second classification method. The second classification method makes the effective nozzle pitch keff greater than the minimum possible nozzle pitch k and thereby advantageously enhances the degree of freedom in selection of scanning parameters to satisfy the above conditions c1"–c3". Appropriate selection of the scanning parameters utilizing this advantage will construct a dot recording scheme that attains high image quality.

The third classification method shown in FIG. 28(c) is similar to the first classification method shown in FIG. 28(a), except that the distance d between the two nozzle groups is changed to 42 dots. The fourth classification method shown in FIG. 28(d) is similar to the second classification method shown in FIG. 28(b), except that the distance d between the two nozzle groups is changed to 6 dots. In general, the distance between M nozzle groups may be arbitrarily set irrespective of the effective nozzle pitch keff and the minimum nozzle pitch k. Namely a variety of methods are applicable for the nozzle classification as long as they classify a plurality of nozzles into M nozzle groups that have an identical number of effective nozzles Neff and an identical effective nozzle pitch keff. The plurality of used nozzles are not required to be aligned in the sub-scanning direction, but may be arranged, for example, in zigzag as shown in FIG. 5(A). When the M nozzle groups are arranged at overlapping positions in the main scanning direction, that is, when the distance d between the nozzle groups is an integral multiple of the effective nozzle pitch keff (including d=0), however, nozzles included in different nozzle groups will execute dot recording at different dot positions on an identical raster line in an identical pass of the main scan. This may result in blot of dots. From this point of view, it is preferable that the M nozzle groups are arranged at the non-overlapping positions in the main scanning direction.

Figure 29:
FIGS. 29(a) and 29(b) show two classification methods of dot positions.
Figure 29:

FIGS. 29(a) and 29(b) show two classification methods of dot positions. The first dot classification method shown in FIG. 29(a) alternately classifies a plurality of dot positions on an identical raster line into two different types. The first dot classification method is generalized to be the method of classifying a plurality of dots on an identical raster line one by one into M different types of dot positions, where M is an integer of not less than 2. Such dot classification can be readily executed according to the value of the remainder obtained by dividing the dot address by M. The six embodiments discussed above adopt this first dot classification method.

The second dot classification method shown in FIG. 29(b) classifies every two dot positions on an identical raster line into two different types. The second dot classification method may be applicable to the case in which two dots aligned in the main scanning direction constitute one pixel. The second dot classification method is generalized to be the method of classifying every m dot positions on an identical raster line at intervals of (M−1)×m dots to M different types of dot positions, where m is an integer of not less than 1 and M is an integer of not less than 2. As clearly understood from this example, it is not necessary that one dot corresponds to one pixel, but a plurality of dots may constitute one pixel. In this case, the terms such as the pixel address, the even pixel, and the odd pixel used in the above embodiments should be read as the dot address, the even dot, and the odd dot.

As described above, a variety of methods may be applicable for classifying dot positions on each raster line into M different types of dot positions in a regular manner.

Figure 30:
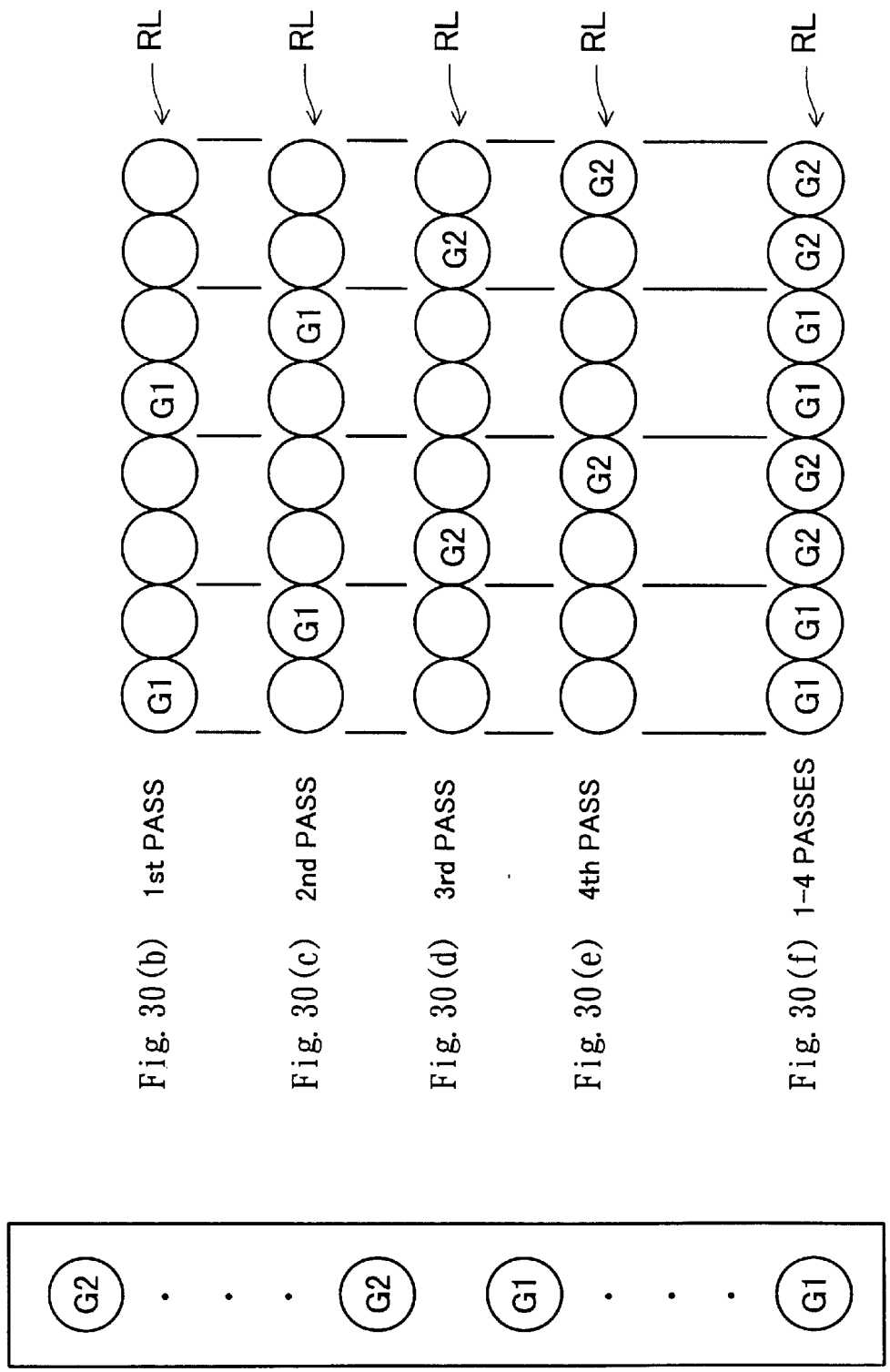
FIGS. 30(a)–30(f) show the relationship between nozzles classification and dot position classification.

FIGS. 30(a)–30(f) show the relationship between classification of nozzles and classification of dot positions. As shown in FIG. 30(a), it is assumed that a plurality of nozzles are divided at the center of the nozzle array into a first nozzle group G1 and a second nozzle group G2. FIGS. 30(b)–30(e) respectively show dot positions on an identical raster line RL recorded by four passes of the main scan. The number of scan repeats s is here equal to 4. In the first pass of the main scan shown in FIG. 30(b), the nozzles in the first nozzle group G1 executed dot recording on every fourth dot. Dot recording on the other three dot positions is executed in the second through fourth passes, respectively. This causes all the dots on the identical raster line RL to be recorded by four passes of the main scan as shown in FIG. 30(f). All the dot positions on this raster line are classified into two different types by every two dots as clearly shown in FIG. 30(f). Namely the two dots recorded by the first nozzle group G1 and the two dots recorded by the second nozzle group G2 are alternately arranged on one raster line.

The example of FIGS. 30(a)–30(f) is obtained by combining the classification of nozzles shown in FIG. 28(a) with the classification of dot positions shown in FIG. 29(b). There are a variety of other available combinations of the classification of nozzles with the classification of dot positions.

In the example of FIGS. 30(b)–30(e), one pass of the main scan executes dot recording intermittently on the identical raster line RL. Such intermittent dot recording is often adopted in the dot recording scheme that varies the size of the dot recorded in one pixel; such a scheme will be hereinafter referred to as the "variable dot recording scheme."

Figure 31:
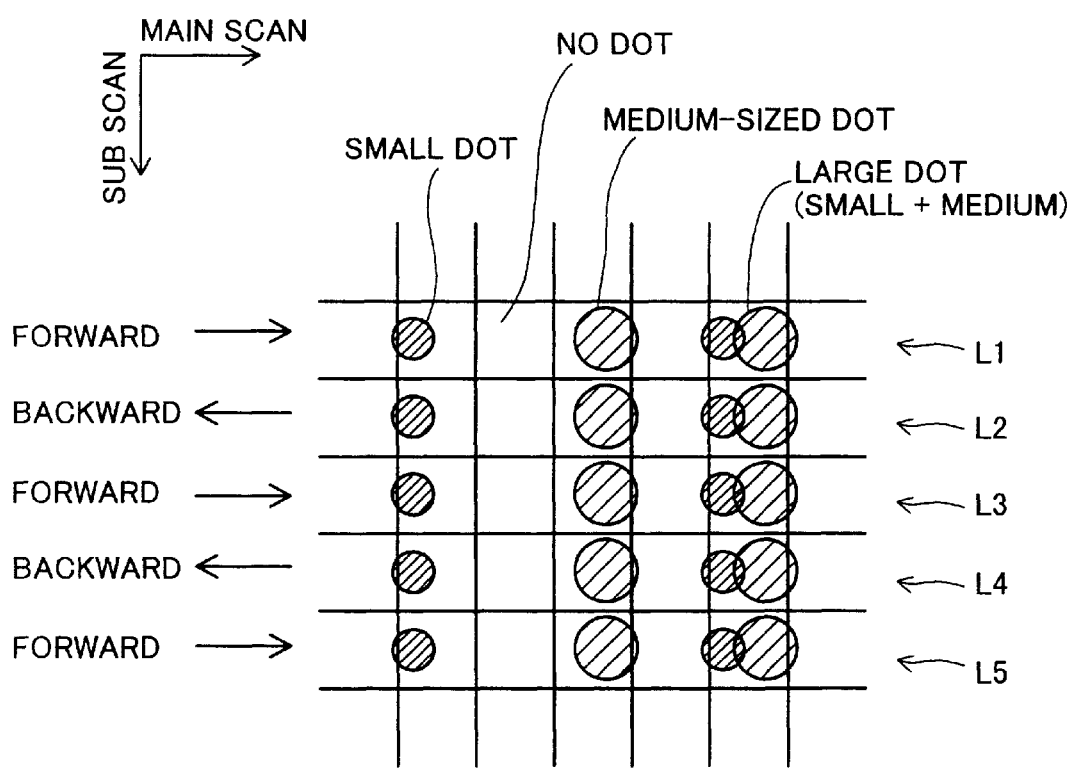
FIG. 31 shows plural different types of dots created in the variable dot recording scheme.

FIG. 31 shows three types of dots formed by the variable dot recording scheme. In the example of FIG. 31, each of the three types of dots having different sizes is formed in one pixel area while the ink amount is regulated. A small dot is formed by spouting a relatively small amount of ink droplet in one pixel area, whereas a middle-sized dot is formed by spouting a relatively large amount of ink droplet in one pixel area forms. A large dot is formed by spouting both of the ink droplets for the small and the middle-sized dots in one pixel area. Accordingly, each pixel is reproduced by four tones (no dot, small dot, middle-sized dot, and large dot).

Figure 32:
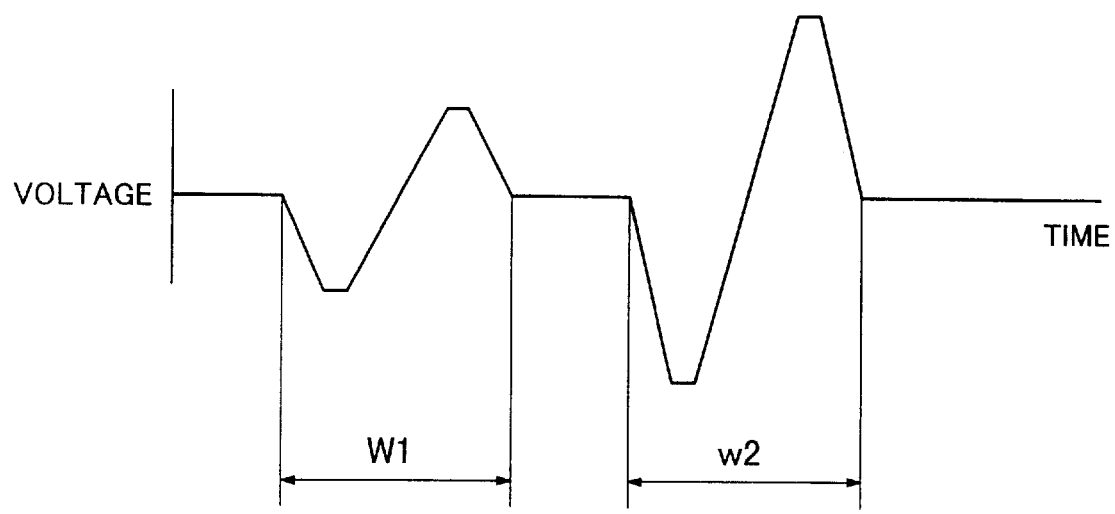
FIG. 32 shows a waveform of a driving signal capable of creating the three different types of dots having different sizes.

FIG. 32 shows a waveform of a driving signal for forming the three different types of dots shown in FIG. 31. One driving waveform W1 (a small dot pulse) is used to form small dots, and the other driving waveform W2 (a middle-sized dot pulse) is used to form middle-sized dots. When these pulses W1, W2 successively occur in one pixel period of main scan as shown in FIG. 32, both of the ink droplets for a small dot and a middle-sized dot are deposited in one identical pixel area to form a large dot.

The amount of ink depends upon the frequency of the driving signal. According to the relationship between the frequency of the driving signal and the natural frequency of the actuator (a circuit of piezoelectric element) for jetting ink droplets, a higher frequency of the driving signal than a specific level may result in unsuccessful jetting of a desired amount of ink. More concretely, when dots are formed at consecutive pixel positions on an identical raster line, the frequency of the driving signal will be excessively high, and the excessively high frequency cannot form the dots to have desired sizes. Accordingly, in some cases, the variable dot recording scheme forms dots only at intermittent pixel positions on an identical raster line. Such restriction arises because the waveform of the driving signal is more complicated in the variable dot recording scheme than the dot recording scheme for forming fixed-sized dots. The technique of recording dots in an intermittent manner as shown in FIGS. 30(a)–30(f) is thus often applicable for the variable dot recording scheme. As clearly understood from this example, the principle of the present invention that classifies both the nozzles and the pixel positions is effectively adopted in the variable dot recording scheme.

Figure 33:
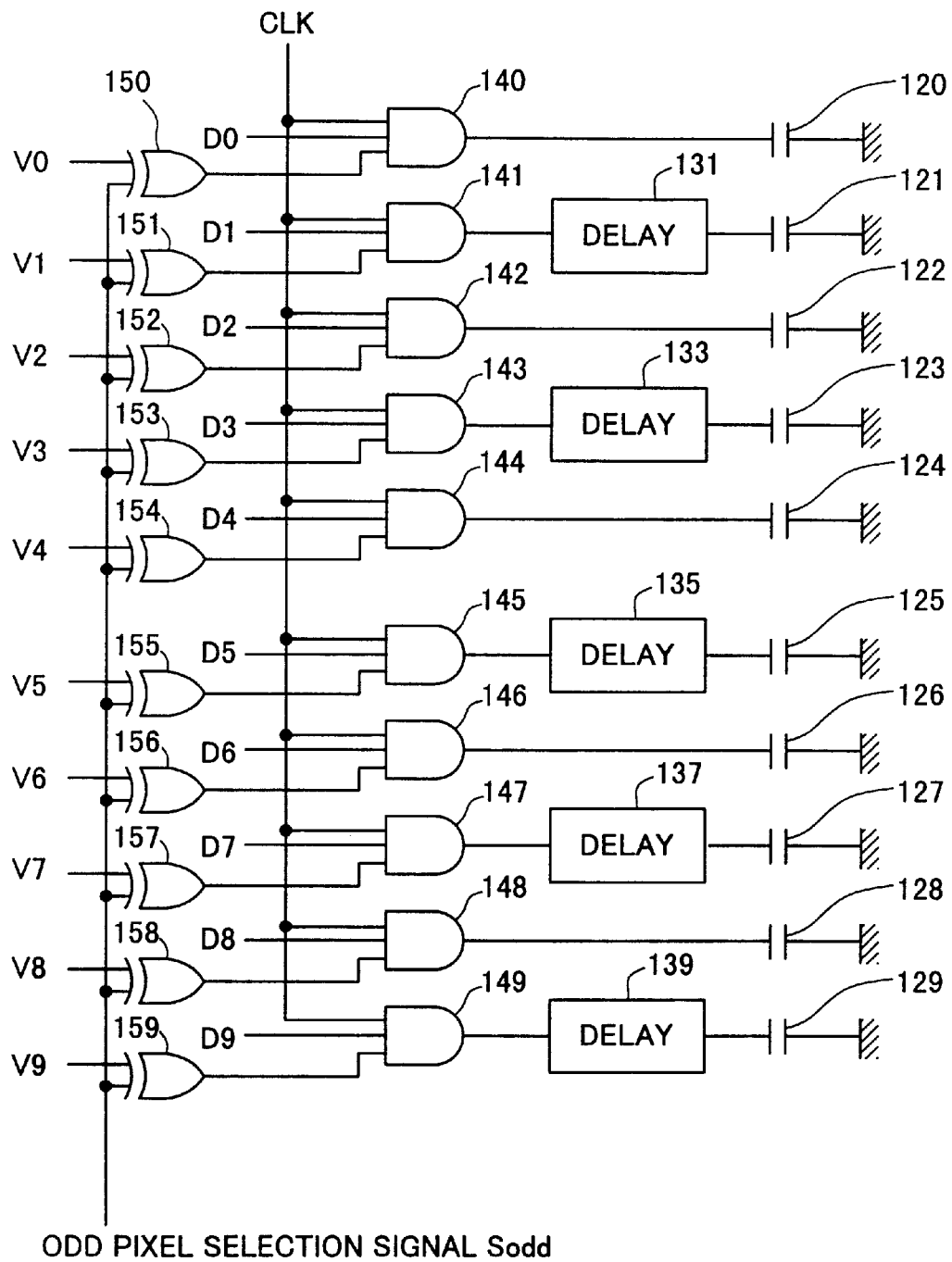
FIG. 33 is an equivalent circuit diagram showing another driving circuit.

FIG. 33 is an equivalent circuit diagram showing another driving circuit that has similar functions to that shown in FIG. 15. The driving circuit of FIG. 33 is constructed by adding EXOR circuits 150–159 before the AND gates 140–149, respectively, in the driving circuit of FIG. 15. The odd pixel selection signal Sodd is commonly input into first input terminals of the respective EXOR circuits 150–159, whereas switching signals V0–V9 are respectively input into their second input terminals. The EXOR circuits 150–159 have the function of an inversion switching circuit that outputs an inverted input signal when the other input is at the High level and outputs a non-inverted input signal when the other input is at the Low level. Either of the odd pixel selection signal Sodd and the even pixel selection signal Seven, which is the inversion of the odd pixel selection signal Sodd, is supplied to the respective AND gates 140–149 by independently switching the levels of the input signals V0–V9 given to the respective EXOR circuits 150–159. By way of example, when the first five switching signals V0–V4 are set at the High level and the other five switching signals V5–V9 are set at the Low level, the driving circuit of FIG. 33 functions in the same manner as that of FIG. 15 and thereby effects the dot recording scheme of the first embodiment (see FIGS. 8–10). In another example, when the switching signals of even numbers V0, V2, . . . , V8 are set at the High level and the switching signals of odd numbers V1, V3, . . . , V9 are set at the Low level, the driving circuit of FIG. 33 effects the dot recording scheme of the second embodiment (see FIGS. 17(A), 17(B) and 18). Namely the EXOR circuits 150–159 have the function of a switching circuitry for selecting one of plural nozzle classification methods. The switching of dot recording schemes using such a switching circuitry may be carried out by the mode specification information writing module 110 (see FIG. 1).

A variety of structures other than the EXOR circuits 150–159 may be used as the switching circuitry for selecting one of a plurality of nozzle classification methods which classify a plurality of nozzles into M nozzle groups, where M is an integer of not less than 2. For example, in order to classify a plurality of nozzles into M nozzle groups where M is not less than 3, a variety of circuits for generating M different types of driving signals may be applicable for the switching circuitry. In this case, each pulse of the M different types of driving signals is generated at the frequency of one per M dots, and the phases of the respective pulses of the driving signals are shifted by one dot.

The switching circuitry for selecting one of a plurality of nozzle classification methods for classifying a plurality of nozzles into M nozzle groups, where M is an integer of not less than 2, advantageously enables different dot recording schemes to be readily attained in the same hardware structure.

All the above embodiments are described with respect to the dot recording schemes for one color. Color printing with a plurality of color inks can be carried out while applying an identical dot recording scheme to the plurality of colors. Some recent printers use a plurality of inks having identical hue and saturation but different lightnesses (densities). For example, dark ink having a higher density and light ink having a lower density are provided for cyan and magenta, respectively, in some printers. In this specification, the inks having the same hue, the same saturation, and the same lightness (density) are regarded as inks of an identical color. In one example, in the case where four dark inks Y, M, C, and K and two light inks for cyan and magenta are provided, the dot recording scheme discussed above may be applied independently to these six inks of different colors.

The principle of the present invention is applicable not only to color printing but to monochromatic printing. The present invention is also applicable to the printing method that reproduces each pixel by a plurality of dots to represent multi-tones. The present invention is further applicable to drum scan printers. In drum scan printers, the drum rotation direction corresponds to the main scanning direction and the direction of feeding the carriage corresponds to the sub-scanning direction. The present invention is applicable not only to ink jet printers but generally to any dot recording apparatus that execute dot recording on the surface of a printing medium with a recording head having an array of dot-forming elements. The dot-forming elements here denote elements for forming dots, such as ink nozzles in the ink jet printers.

In the embodiments described above, the program for controlling dot forming is provided in the printer driver 96 of the computer 90. The program may, however, be provided in the printer 20. For example, when an image to be printed is written in a language such as PostScript, and transferred from the computer 90 to the printer 20, the printer 20 will have the halftone module 99 and the other related elements. In the above embodiments, the software for implementing these functions is stored in the hard disk of the computer 90 and incorporated into the operating system in the form of the printer driver at the time of starting the computer 90. The software may be stored in a portable recording medium, such as a floppy disk or a CD-ROM, and transferred from the portable recording medium to the main memory or an external storage device of the computer system. In another possible application, the software may be transferred from the computer 90 to the printer 20. In still another possible application, an apparatus for supplying the software may transmit the halftone module to the computer or the printer 20 via the communications network.

Figure 34:
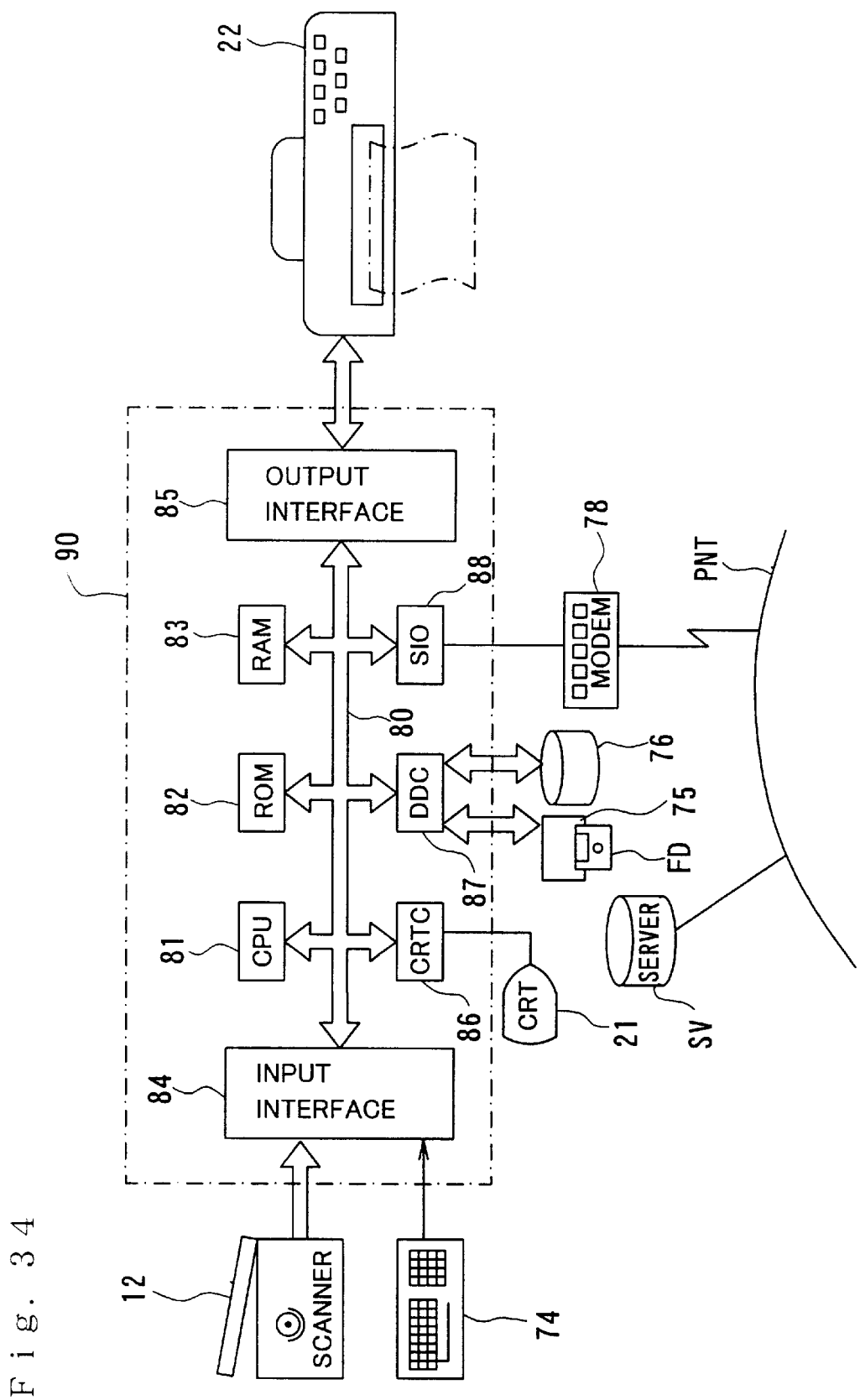
FIG. 34 shows the internal structure of the computer 90 connected to a network.
Figure 35:
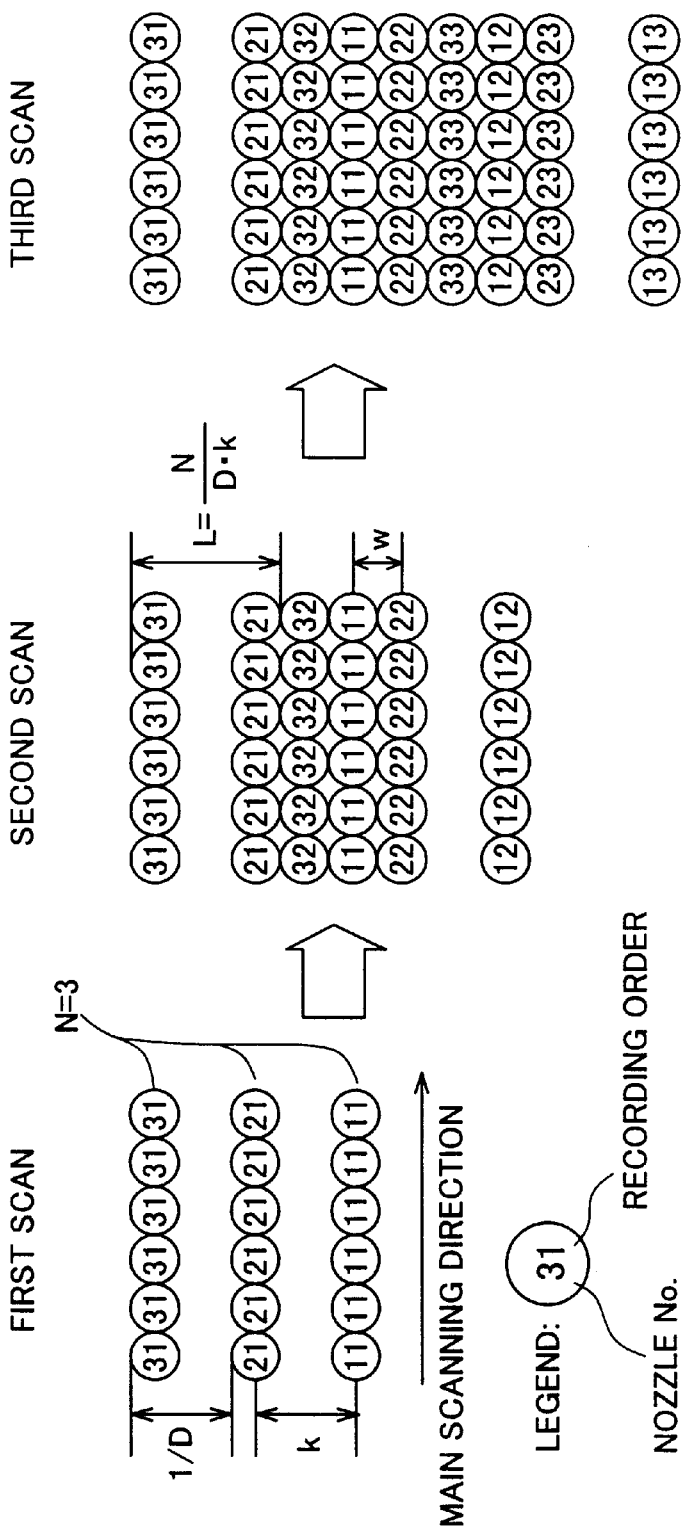
FIG. 35 shows an example of the conventional interlace recording scheme.
Figure 36:
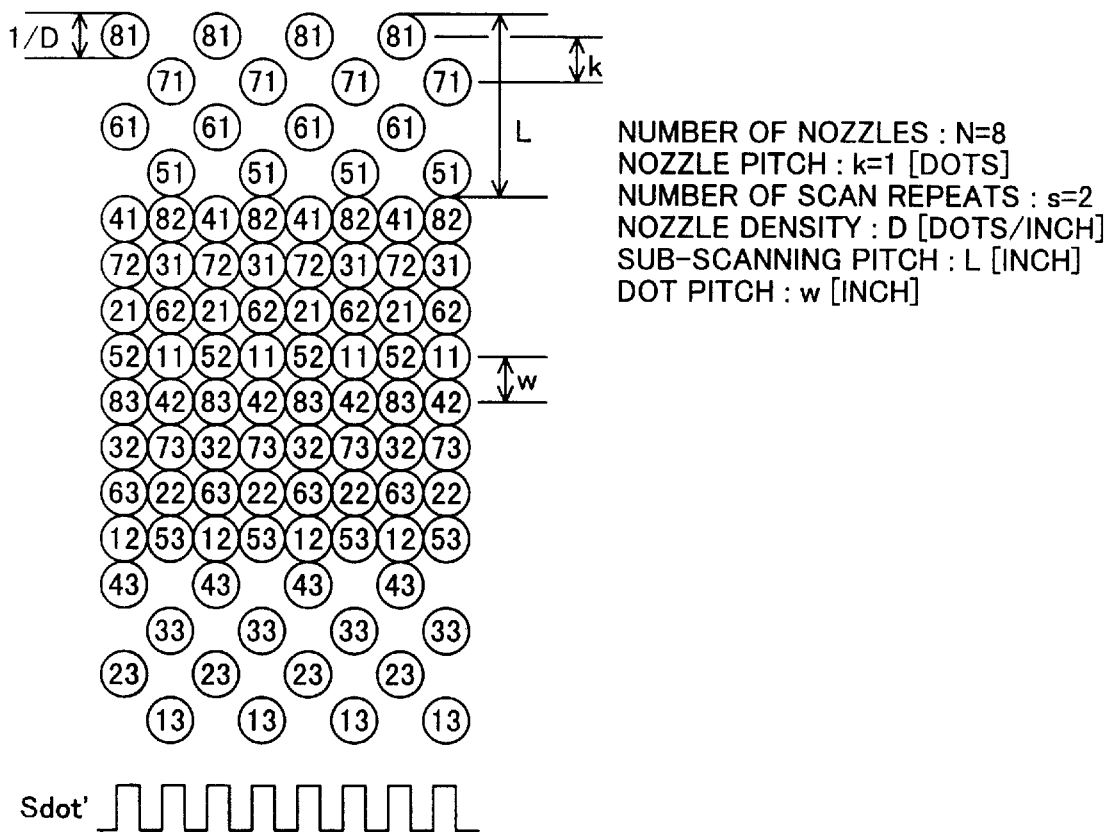
FIG. 36 shows an example of the conventional overlap recording scheme.

The computer 90 may be structured as described below, to implement the above functions. FIG. 34 is a block diagram illustrating the internal structure of the computer 90. As illustrated in FIG. 34, the computer 90 includes a CPU 81 and other peripheral units mutually connected to one another via a bus 80. The CPU 81 executes a variety of arithmetic and logic operations according to computer programs in order to control operations related to image processing. ROM 82 stores computer programs and data required for execution of the variety of arithmetic and logic operations by the CPU 81. RAM 83 is a memory, which temporally stores various computer programs and data required for execution of the variety of arithmetic and logic operations by the CPU 81. An input interface 84 receives input signals from the scanner 12 and a keyboard 74, whereas an output interface 85 sends output data to the printer 22. A CRT controller (CRTC) 86 controls signal outputs to a CRT 21 that can display color images. A disk drive controller (DDC) 87 controls transmission of data from and to a hard disk 76, a flexible disk drive 75, and a CD-ROM drive (not shown). The hard disk 76 stores a variety of computer programs that are loaded into the RAM 83 and executed, as well as other computer programs that are supplied in the form of device drivers. A serial input-output interface (SIO) 88 is also connected to the bus 80. The SIO 88 is connected to a public telephone network PNT via a modem 78. The computer 90 is connected with an external network via the SIO 88 and the modem 78, and can access a specific server SV in order to download the computer programs for image processing into the hard disk 76. The computer 90 may alternatively execute the required programs which have been loaded from a flexible disk FD or a CD-ROM.

The various computer programs executed in the above embodiments can be stored on a flexible disc or a CD-ROM. The computer 90 read these computer programs to implement the above dot recording schemes.

In the specification hereof, the term computer 90 implies both the hardware and its operating system and more specifically represents the hardware operating under the control of the operating system. When an operating system is not required and the application program itself makes the hardware device to operate, the hardware device itself is the to be a computer. The hardware device at least comprises a microprocessor such as CPU and a unit for reading a computer program stored on a recording medium. The computer programs includes program codes for causing a computer to implement the above functions. Part of these functions may be implemented by the operating system instead of the applications programs.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for recording dots on a surface of a printing medium, comprising:

a dot recording head having a dot-forming element array, the dot-forming array having a plurality of dot-forming elements which form a plurality of dots of an identical color that are substantially aligned in a sub-scanning direction;

a main scan driving unit that moves at least one of the dot record head and the printing medium to carry out a main scan;

a head driving unit that use at least part of the plurality of dot-forming elements to form dots in the course of the main scan;

a sub-scan driving unit that moves at least one of the dot recording head and the printing medium every time when the main scan is completed, thereby carrying out sub-scan; and a control unit that controls the above units;

wherein a plurality of dot-forming elements in use are divided into M element groups, each element group including Neff dot-forming elements, where Neff is an integer of not less than 2 and M is an integer of not less than 2, wherein a plurality of dot positions on each raster line in a main scanning direction are classified into M different types of dot positions, and wherein the control unit controls the head driving unit and the sub-scan driving unit so that the Neff dot-forming elements included in each element group execute dot recording at one identical type of dot positions among the M different types of dot positions and the M element groups respectively execute the dot recording at different types of dot positions, to thereby execute the dot recording at all the different types of dot positions in an effective recording area of the printing medium.

2. An apparatus in accordance with claim 1, wherein the Neff dot-forming elements included in each element group are arranged at a fixed pitch measured in the sub-scanning direction, the fixed pitch being common to the M element groups.

3. An apparatus in accordance with claim 1, wherein the plurality of dot-forming elements in use are divided into the M element groups that are sequentially aligned in the sub-scanning direction to be separated from each other.

4. An apparatus in accordance with claim 1, wherein the plurality of dot-forming elements in use are sequentially allocated to the M element groups one by one along the sub-scanning direction.

5. An apparatus in accordance with claim 1, wherein the control unit comprises a switching unit that selects one of a plurality of classifications which classify the plurality of dot-forming elements in use into the M element groups.

6. An apparatus in accordance with claim 1, wherein the apparatus is an ink jet printer, and the dot-forming elements are ink jet nozzles.

7. A method for recording dots on a surface of a printing medium, comprising the steps of:

(a) carrying out a main scan by moving at least one of the dot record head and the printing medium;

(b) executing dot recording with a dot recording head having a dot-forming element array, the dot-forming array having a plurality of dot-forming elements which form a plurality of dots of an identical color that are substantially aligned in a sub-scanning direction, at least part of the plurality of dot-forming elements being used to form dots in the course of the main scan; and (c) carrying out a sub-scan by moving at least one of the dot recording head and the printing medium every time when the main scan is completed;

wherein a plurality of dot-forming elements in use are divided into M element groups, each element group including Neff dot-forming elements, where Neff is an integer of not less than 2 and M is an integer of not less than 2, wherein a plurality of dot positions on each raster line in a main scanning direction are classified into M different types of dot positions, and wherein the steps (a) through (c) are carried out so that the Neff dot-forming elements included in each element group execute dot recording at one identical type of dot positions among the M different types of dot, positions and the M element groups respectively execute the dot recording at different types of dot positions, to thereby execute the dot recording at all the different types of dot positions in an effective recording area of the printing medium.

8. A method in accordance with claim 7, wherein the Neff dot-forming elements included in each element group are arranged at a fixed pitch measured in the sub-scanning direction, the fixed pitch being common to the M element groups.

9. A method in accordance with claim 7, wherein the plurality of dot-forming elements in use are divided into the M element groups that are sequentially aligned in the sub-scanning direction to be separated from each other.

10. A method in accordance with claim 7, wherein the plurality of dot-forming elements in use are sequentially allocated to the M element groups one by one along the sub-scanning direction.

11. A computer program product for use in a dot recording apparatus for recording dots on a surface of a printing medium, the dot recording apparatus comprising a computer and a dot recording head having a dot-forming element array, the dot-forming array having a plurality of dot-forming elements to form a plurality of dots of an identical color that are substantially aligned in a sub-scanning direction, the computer program product comprising:

a computer readable medium; and a computer program stored on the computer readable medium, the computer program comprising:

a first program for causing a computer to carrying out a main scan by moving at least one of the dot record head and the printing medium;

a second program for causing the computer to execute dot recording with the dot recording head while using at least part of the plurality of dot-forming elements to form dots in the course of the main scan; and a third program for causing the computer to carry out a sub-scan by moving at least one of the dot recording head and the printing medium every time when the main scan is completed;

wherein a plurality of dot-forming elements in use are divided into M element groups, each element group including Neff dot-forming elements, where Neff is an integer of not less than 2 and M is an integer of not less than 2, wherein a plurality of dot positions on each raster line in a main scanning direction are classified into M different types of dot positions, and wherein the first through third programs are executed so that the Neff dot-forming elements included in each element group execute dot recording at one identical type of dot positions among the M different types of dot positions and the M element groups respectively execute the dot recording at different types of dot positions, to thereby execute the dot recording at all the different types of dot positions in an effective recording area of the printing medium.

12. A computer program product in accordance with claim 11, wherein the Neff dot-forming elements included in each element group are arranged at a fixed pitch measured in the sub-scanning direction, the fixed pitch being common to the M element groups.

13. A computer program product in accordance with claim 11, wherein the plurality of dot-forming elements in use are divided into the M element groups that are sequentially aligned in the sub-scanning direction to be separated from each other.

14. A computer program product in accordance with claim 11, wherein the plurality of dot-forming elements in use are sequentially allocated to the M element groups one by one along the sub-scanning direction.

* * * * *